US007492483B2

(12) United States Patent
Inoue

(10) Patent No.: US 7,492,483 B2
(45) Date of Patent: Feb. 17, 2009

(54) THRESHOLD MATRIX, A METHOD OF GENERATING THE SAME, AND A METHOD OF ASSIGNING THE SAME

(75) Inventor: Yoshiaki Inoue, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 497 days.

(21) Appl. No.: 11/071,197

(22) Filed: Mar. 4, 2005

(65) Prior Publication Data

US 2005/0195440 A1   Sep. 8, 2005

(30) Foreign Application Priority Data

Mar. 5, 2004   (JP)   ............................. 2004-062920
Jan. 19, 2005   (JP)   ............................. 2005-011665

(51) Int. Cl.
G06K 15/00   (2006.01)
H04N 1/46   (2006.01)
H04N 1/407   (2006.01)

(52) U.S. Cl. ..................... 358/3.14; 358/3.14; 358/3.26; 358/535

(58) Field of Classification Search .................. 358/515, 358/530–536, 538, 1.9, 3.15, 3.12, 3.19, 358/274, 520, 3.3, 3.18, 514; 382/254, 270, 382/274
See application file for complete search history.

(56) References Cited

U.S. PATENT DOCUMENTS

| | | | |
|---|---|---|---|
| 3,983,319 A * | 9/1976 | Moe et al. | ................... 358/3.15 |
| 5,315,406 A | 5/1994 | Levien | |
| 5,689,623 A | 11/1997 | Pinard | |
| 5,726,772 A | 3/1998 | Parker et al. | |
| 5,731,884 A | 3/1998 | Inoue | |
| 5,734,759 A * | 3/1998 | Hirota et al. | ................. 382/274 |
| 5,831,626 A | 11/1998 | Sano et al. | |
| 5,832,122 A * | 11/1998 | Shimazaki | ................. 358/3.26 |
| 5,867,607 A * | 2/1999 | Shibuya et al. | ............... 358/1.9 |

(Continued)

FOREIGN PATENT DOCUMENTS

JP   61-248661   11/1986

(Continued)

OTHER PUBLICATIONS

J. Sullivan, et al., "Design of Minimum Visual Modulation Halftone Patterns", IEEE Transactions on Systems, Man and Cybernetics, Jan./Feb. 1991, pp. 33-38, vol. 21, No. 1.

(Continued)

*Primary Examiner*—King Y Poon
*Assistant Examiner*—Akwasi M Sarpong
(74) *Attorney, Agent, or Firm*—Sughrue Mion, PLLC

(57) ABSTRACT

The number of pixels of a dot of a minimum size, a pattern frequency of an intermediate tone, the number of new dots of the minimum size at each dot percentage are determined. Then, thresholds in the threshold matrix are determined so that the optimum dot pattern at each dot percentage is obtained, and a threshold matrix is generated. A threshold matrix for C-separation is assigned to a separation for R that is complementary to C. A threshold matrix for M-separation is assigned to a separation for G that is complementary to M. A threshold matrix for Y-separation is assigned to a separation for B that is complementary to Y.

9 Claims, 24 Drawing Sheets

U.S. PATENT DOCUMENTS

| | | | |
|---|---|---|---|
| 5,943,143 A * | 8/1999 | Kawai et al. | 358/520 |
| 6,101,002 A | 8/2000 | Urasawa | |
| 6,172,770 B1 | 1/2001 | Inoue | |
| 6,288,795 B1 * | 9/2001 | Urasawa | 358/3.09 |
| 6,335,989 B1 | 1/2002 | Lin | |
| 6,493,112 B1 * | 12/2002 | Arce et al. | 358/3.19 |
| 6,573,917 B2 * | 6/2003 | Sadka | 358/515 |
| 6,714,320 B1 | 3/2004 | Nakahara et al. | |
| 6,798,537 B1 | 9/2004 | Lau et al. | |
| 6,813,044 B2 | 11/2004 | Rylander | |
| 6,906,825 B1 * | 6/2005 | Nakahara et al. | 358/1.9 |
| 6,934,054 B1 * | 8/2005 | Hilsdorf et al. | 358/1.9 |
| 6,943,808 B2 | 9/2005 | Hains et al. | |
| 7,245,402 B2 * | 7/2007 | McCrea et al. | 358/3.3 |
| 2001/0012129 A1 | 8/2001 | Inoue | |
| 2001/0013941 A1 | 8/2001 | Ogiyama et al. | |
| 2002/0186418 A1 | 12/2002 | Inoue | |
| 2003/0053085 A1 * | 3/2003 | Takemoto | 358/1.9 |
| 2003/0081258 A1 | 5/2003 | Sugizaki | |
| 2003/0107768 A1 * | 6/2003 | Crounse | 358/3.3 |
| 2003/0218780 A1 * | 11/2003 | Braun et al. | 358/3.12 |
| 2004/0114168 A1 * | 6/2004 | Kuiper | 358/1.9 |
| 2005/0195439 A1 | 9/2005 | Inoue et al. | |
| 2005/0195441 A1 | 9/2005 | Inoue et al. | |
| 2005/0195442 A1 | 9/2005 | Inoue et al. | |
| 2006/0164698 A1 * | 7/2006 | Kurumisawa | 358/515 |
| 2006/0164699 A1 | 7/2006 | Inoue | |
| 2006/0221400 A1 | 10/2006 | Sugizaki | |
| 2007/0127837 A1 * | 6/2007 | Ishii | 382/270 |

FOREIGN PATENT DOCUMENTS

| | | |
|---|---|---|
| JP | 62-044744 | 2/1987 |
| JP | 64-044583 A | 2/1989 |
| JP | 02-202174 A | 8/1990 |
| JP | 8-265566 A | 10/1996 |
| JP | 2001-028685 A | 1/2001 |
| JP | 2001-292317 A | 10/2001 |
| JP | 2002-368995 A | 12/2002 |
| JP | 2002-369005 A | 12/2002 |
| JP | 3400316 B2 | 2/2003 |
| JP | 2003-143405 A | 5/2003 |
| JP | 2003-152999 A | 5/2003 |
| JP | 2003-204433 A | 7/2003 |
| JP | 3461377 B2 | 8/2003 |
| JP | 2004-015410 A | 1/2004 |
| JP | 2004-064473 A | 2/2004 |
| WO | WO 02/065755 A1 | 8/2002 |

OTHER PUBLICATIONS

Dalton, John C., "Perception of Binary Texture and the Generation of Stochastic Halftone Screens", Proc. SPIE, vol. 2411, pp. 207-220, 1995.

Ross, John C., "The Image Processing Handbook, 3$^{rd}$ Edition, CRC Press, 1999, pp. 341-342".

* cited by examiner

WH

AFFT2 r

±Δ

A2

A2_bin

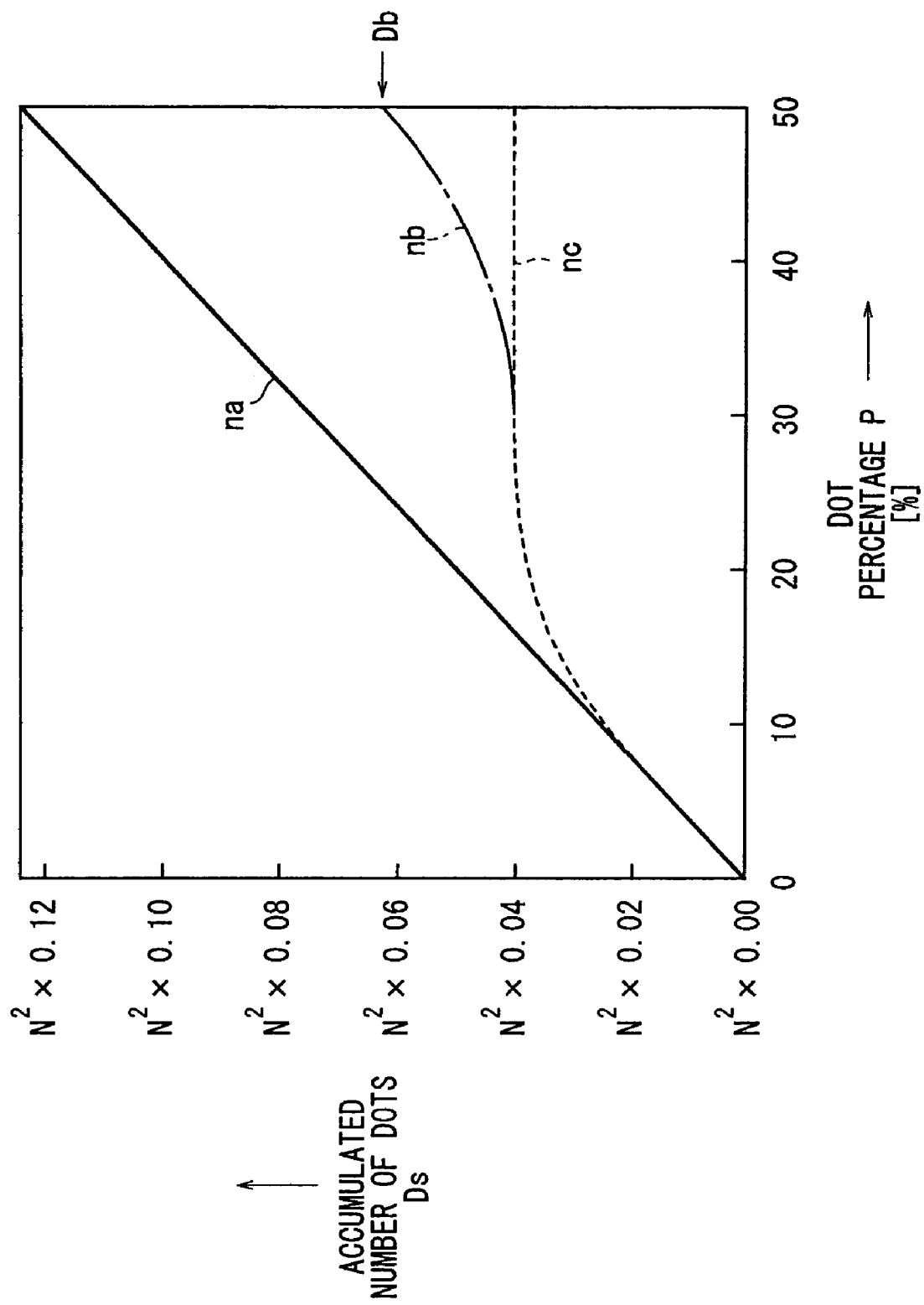

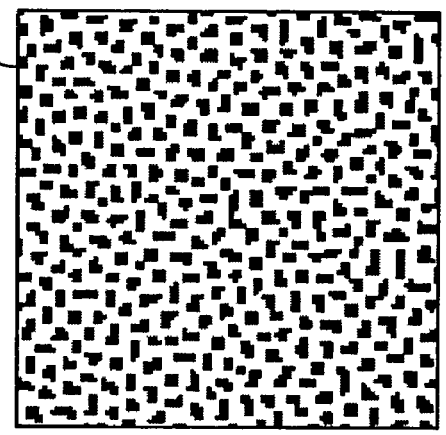
FIG. 11A (10%) 131
FIG. 11B (20%) 132
FIG. 11C (30%) 133
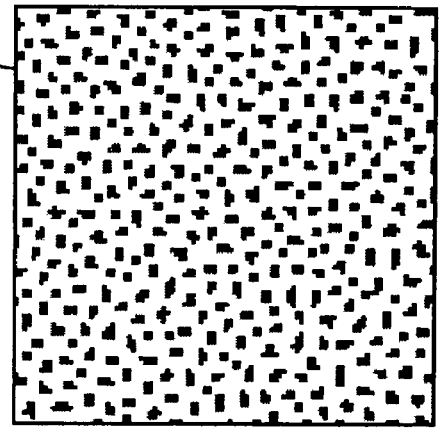
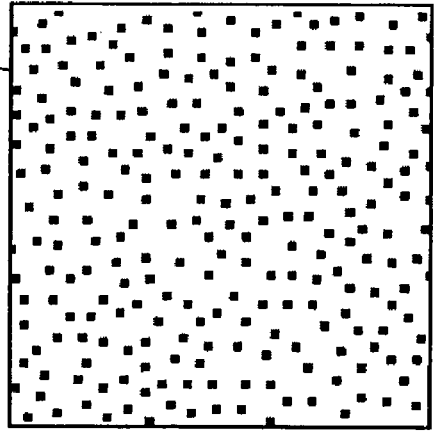
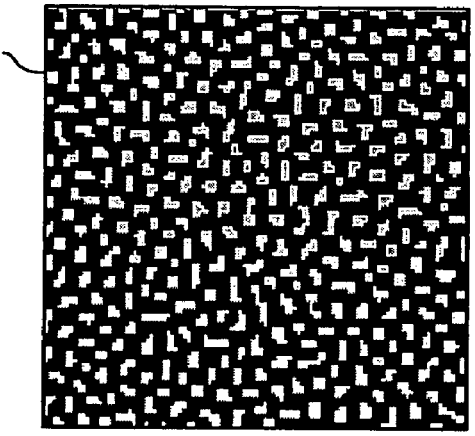
FIG. 11D (40%) 134
FIG. 11E (50%) 135
FIG. 11F (70%) 137
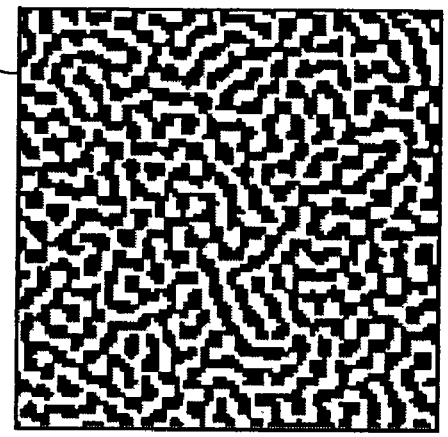
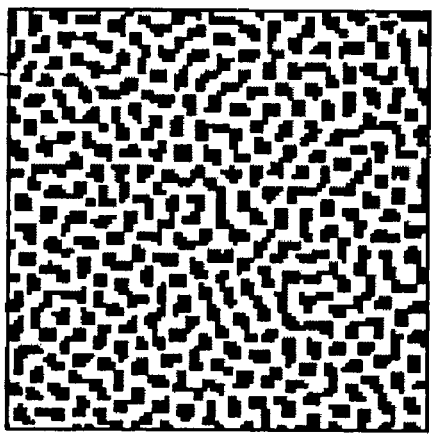

FIG. 16

|  |  |  |  | TMorg |  |  |  |  |  |  |  |  | TMother |  |  |  | TMorg |  |
|---|---|---|---|---|---|---|---|---|---|---|---|---|---|---|---|---|---|---|
| 78 | 40 | 58 | 64 | 35 | 80 | 29 | 10 | 72 | 49 | 78 | 40 | 58 | 64 | 35 | 80 | 29 | 10 | 72 | 49 |
| 84 | 60 | 36 | 17 | 94 | 43 | 88 | 48 | 30 | 2 | 84 | 60 | 36 | 17 | 94 | 43 | 88 | 48 | 30 | 2 |
| 20 | 0 | 41 | 24 | 61 | 68 | 73 | 13 | 82 | 70 | 20 | 0 | 41 | 24 | 61 | 68 | 73 | 13 | 82 | 70 |
| 45 | 23 | 39 | 8 | 22 | 95 | 26 | 79 | 16 | 99 | 45 | 23 | 39 | 8 | 22 | 95 | 26 | 79 | 16 | 99 |
| 85 | 32 | 34 | 92 | 93 | 54 | 66 | 67 | 19 | 90 | 85 | 32 | 34 | 92 | 93 | 54 | 66 | 67 | 19 | 90 |
| 50 | 87 | 11 | 77 | 1 | 81 | 28 | 25 | 86 | 42 | 50 | 87 | 11 | 77 | 1 | 81 | 28 | 25 | 86 | 42 |
| 97 | 12 | 96 | 46 | 98 | 63 | 33 | 51 | 14 | 6 | 97 | 12 | 96 | 46 | 98 | 63 | 33 | 51 | 14 | 6 |
| 65 | 47 | 44 | 37 | 91 | 89 | 4 | 7 | 62 | 53 | 65 | 47 | 44 | 37 | 91 | 89 | 4 | 7 | 62 | 53 |
| 57 | 18 | 31 | 69 | 5 | 15 | 56 | 21 | 83 | 27 | 57 | 18 | 31 | 69 | 5 | 15 | 56 | 21 | 83 | 27 |
| 59 | 55 | 74 | 75 | 3 | 76 | 9 | 71 | 52 | 38 | 59 | 55 | 74 | 75 | 3 | 76 | 9 | 71 | 52 | 38 |
| 78 | 40 | 58 | 64 | 35 | 80 | 29 | 10 | 72 | 49 | 78 | 40 | 58 | 64 | 35 | 80 | 29 | 10 | 72 | 49 |
| 84 | 60 | 36 | 17 | 94 | 43 | 88 | 48 | 30 | 2 | 84 | 60 | 36 | 17 | 94 | 43 | 88 | 48 | 30 | 2 |
| 20 | 0 | 41 | 24 | 61 | 68 | 73 | 13 | 82 | 70 | 20 | 0 | 41 | 24 | 61 | 68 | 73 | 13 | 82 | 70 |
| 45 | 23 | 39 | 8 | 22 | 95 | 26 | 79 | 16 | 99 | 45 | 23 | 39 | 8 | 22 | 95 | 26 | 79 | 16 | 99 |
| 85 | 32 | 34 | 92 | 93 | 54 | 66 | 67 | 19 | 90 | 85 | 32 | 34 | 92 | 93 | 54 | 66 | 67 | 19 | 90 |
| 50 | 87 | 11 | 77 | 1 | 81 | 28 | 25 | 86 | 42 | 50 | 87 | 11 | 77 | 1 | 81 | 28 | 25 | 86 | 42 |
| 97 | 12 | 96 | 46 | 98 | 63 | 33 | 51 | 14 | 6 | 97 | 12 | 96 | 46 | 98 | 63 | 33 | 51 | 14 | 6 |
| 65 | 47 | 44 | 37 | 91 | 89 | 4 | 7 | 62 | 53 | 65 | 47 | 44 | 37 | 91 | 89 | 4 | 7 | 62 | 53 |
| 57 | 18 | 31 | 69 | 5 | 15 | 56 | 21 | 83 | 27 | 57 | 18 | 31 | 69 | 5 | 15 | 56 | 21 | 83 | 27 |
| 59 | 55 | 74 | 75 | 3 | 76 | 9 | 71 | 52 | 38 | 59 | 55 | 74 | 75 | 3 | 76 | 9 | 71 | 52 | 38 |

Rs(5, 4) points to the cell containing 22. Labels: TMorg (top-left, bottom-left, bottom-right), TMother (top-middle), TMorg (top-right).

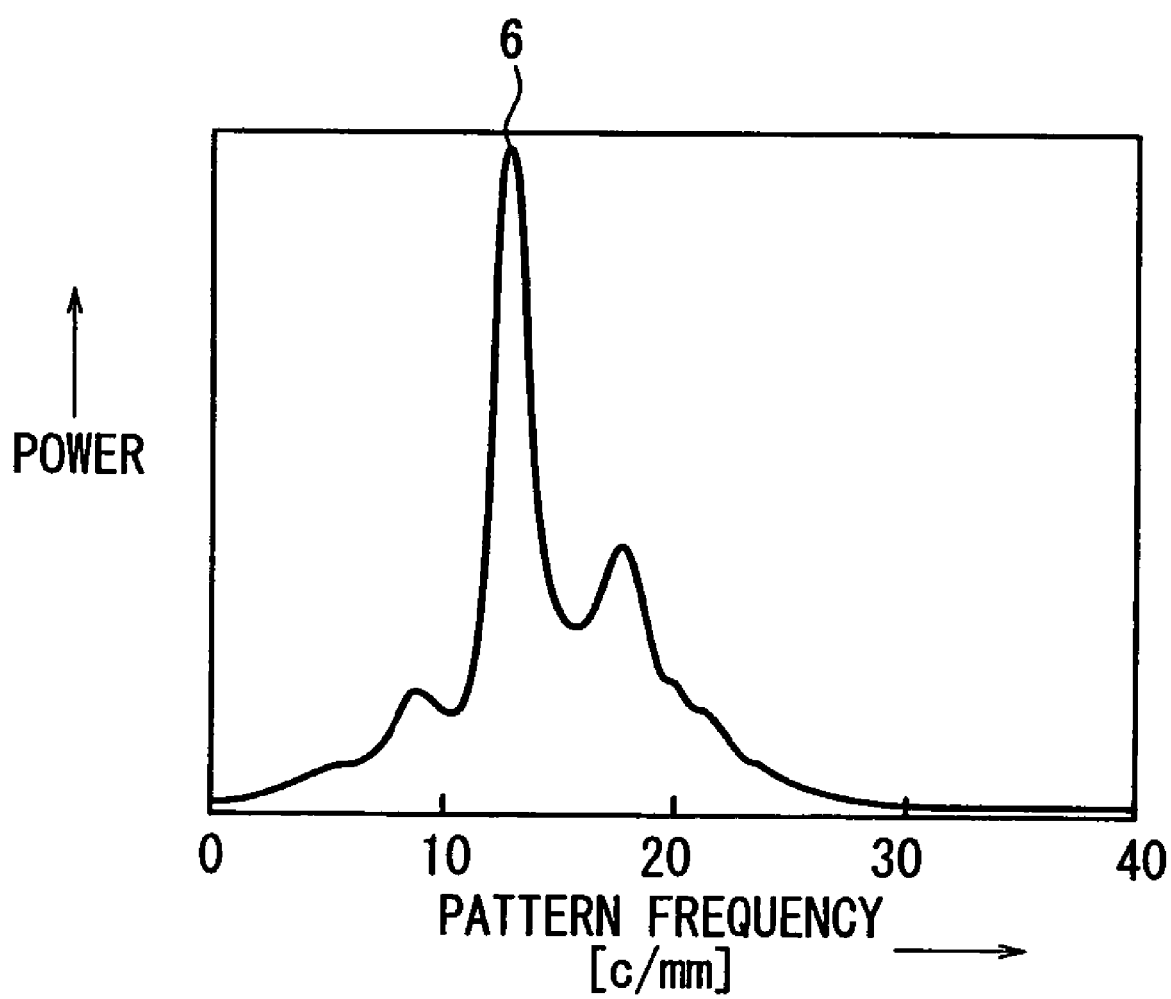

THRESHOLD MATRIX, A METHOD OF GENERATING THE SAME, AND A METHOD OF ASSIGNING THE SAME

BACKGROUND OF THE INVENTION

1. Field of the Invention

The present invention relates to a threshold matrix and a method of generating such a threshold matrix, for generating a screen which is called an FM screen or a stochastic screen for converting a continuous-tone image input with a tone value u (for example, u=256) into a dot pattern representative of a v-valued ($2 \leq v < u$) image in which no screen ruling or screen angle is defined. More particularly, the present invention relates to a threshold matrix, a method of generating such a threshold matrix and a method of assigning such a threshold matrix that are suitable for use in a printing-related apparatus (output system) such as a filmsetter, a platesetter, a CTP (Computer To Plate) apparatus, a CTC (Computer To Cylinder) apparatus, a DDCP (Direct Digital Color Proof) system, etc., an ink jet printer, or an electrophotographic printer.

In the present invention, the dot pattern in which no screen ruling or screen angle is defined refers not to a general AM screen (including a line screen etc.) having halftone dots with the screen ruling and screen angle being uniquely determined, but to a pattern that is generally categorized as an FM screen or a stochastic screen.

2. Description of the Related Art

Heretofore, so-called AM (Amplitude Modulation) screens characterized by screen ruling, screen angle, and dot shape, and FM (Frequency Modulation) screens have been used in the art of printing.

A process of generating a threshold matrix for FM screens is disclosed in Japanese Laid-Open Patent Publication No. 8-265566.

According to the disclosed process, an array of elements of a threshold matrix, i.e., an array of thresholds is generated in an ascending order or a descending order by determining threshold positions such that the position of an already determined threshold is spaced the greatest distance from the position of a threshold to be newly determined. The dot pattern of a binary image that is generated using the threshold matrix thus produced has dots which are not localized. Even when a dot pattern is generated using a plurality of such threshold matrixes that are juxtaposed, the dot pattern does not suffer a periodic pattern produced by the repetition of threshold matrixes.

A plurality of patent documents given below are relevant to the generation of a threshold matrix.

Japanese Patent No. 3400316 discloses a method of correcting halftone image data by extracting a pixel having a weakest low-frequency component of a certain dot pattern, from white pixels (unblackened pixels), and a pixel having a strongest low-frequency component of the dot pattern, from blackened pixels, and switching around the extracted white and blackened pixels. Thus, the dot pattern is intended to be smoothed or leveled.

Japanese Laid-Open Patent Publication No. 2001-292317 reveals a process of determining threshold positions in a threshold matrix such that a next blackened pixel is assigned to a position having a weakest low-frequency component of the threshold matrix.

Japanese Laid-Open Patent Publication No. 2002-368995 shows a process of determining threshold positions in a threshold matrix such that when an array of thresholds in the threshold matrix has been determined up to a certain gradation and a threshold position for a next gradation is to be determined, blackened pixels are assigned to positions for not strengthening a low-frequency component.

Japanese Laid-Open Patent Publication No. 2002-369005 discloses a process of generating a threshold matrix according to the process shown in Japanese Patent No. 3400316, Japanese Laid-Open Patent Publication No. 2001-292317, or Japanese Laid-Open Patent Publication No. 2002-368995 based on an ideal dot pattern at a certain gradation which is given.

When an FM screen is used for offset printing, it causes shortcomings in that the quality of printed images suffers some grainness. FM screens also cause disadvantages in that a dot gain tends to become large and images are reproduced unstably when images are printed, or when films are output in an intermediate printing process, or when a printing plate is output by a CTP apparatus.

According to the conventional FM screening process, when a dot size is determined to be the size of a dot made up of one pixel or a dot made up of four pixels according to a 1 (1×1)-pixel FM screen or a 4 (2×2)-pixel FM screen, an array of thresholds of a threshold matrix is determined by an algorithm for generating FM screens, thus determining an output quality, and only the dot size serves as a parameter for determining the quality of FM screens. For example, if a dot size is determined to be a 3×3-pixel FM screen dot size with respect to an output system which is incapable of stably reproducing 2×2-pixel FM screen dots for highlight areas, then the resolution (referred to as pattern frequency or pattern resolution) for intermediate tones is lowered, resulting in a reduction in the quality of images.

FIG. 22 of the accompanying drawings shows a conventional dot pattern 1 in a highlight area where the dot percentage of a 2×2-pixel FM screen is 5%, a conventional dot pattern 2 in an intermediate tone area where the dot percentage of the 2×2-pixel FM screen is 50%, a conventional dot pattern 3 in a highlight area where the dot percentage of a 3×3-pixel FM screen is 5%, and a conventional dot pattern 4 in an intermediate tone area where the dot percentage of the 3×3-pixel FM screen is 50%.

FIG. 23 of the accompanying drawings shows a power spectrum generated when the dot pattern 2 of the 2×2-pixel FM screened shown in FIG. 22 is FFTed (Fast-Fourier-Transformed), and FIG. 24 of the accompanying drawings shows a power spectrum generated when the dot pattern 4 of the 3×3-pixel FM screen shown in FIG. 22 is FFTed.

In FIG. 22, at the dot percentage of 50% in the intermediate tone area, the dot pattern 2 of the 2×2-pixel FM screen suffers less grainness than the dot pattern 4 of the 3×3-pixel FM screen, but has the dot percentage less reproducible in the printed image. On the other hand, at the dot percentage of 50% in the intermediate tone area, the dot pattern 4 of the 3×3-pixel FM screen has a pattern frequency 6 of about 13 c/mm which is lower than the pattern frequency 5 of about 20 c/mm of the dot pattern 2 of the 2×2-pixel FM screen. The pattern frequencies 5, 6 which are of peak values are also called a peak spatial frequency fpeak.

The output resolution of an output system such as an imagesetter, a CTP apparatus, etc. (the output resolution of an output system will hereinafter be referred to as output resolution R) is set to 2540 pixels/inch=100 pixels/mm or 2400 pixels/inch=94.488 pixels/mm, for example. With those settings, the dot size of the 1×1 pixel FM screen is 10 μm×10 μm (10.6 μm×10.6 μm), and the dot size of the 2×2 pixel FM screen is 20 μm×20 μm (21.2 μm×21.2 μm). In this description, the output resolution R is different from the pattern frequencies 5, 6 of the dot patterns 2, 4 shown in FIGS. 23, 24.

Recently, reproduction of a color image has been achieved by an ink jet printer or in offset printing, in more than four colors of C (Cyan), M (Magenta), Y (Yellow) and K (Black), i.e., five or more colors such as seven colors of C, M, Y, K, R (Red), G (Green) and B (Blue), or six colors of C, M, Y, K, O (Orange) and G.

When a color image is reproduced in more than four colors, it is expected that the color reproduction range is widened. In using plates for C, M, Y and K colors, it is necessary to superimpose a Y-plate on an M-plate for reproducing R. Also, it is necessary to superimpose a C-plate on the Y-plate for reproducing G. In contrast, when a color image is reproduced in more than four colors of C, M, Y and K, it is sufficient to use an R-plate for reproducing R and to use a G-plate for reproducing G. Thus, it is possible to reduce the amount of ink in printing.

For generating plates for five or more colors, dot patterns representative of a v-valued image in which no screen ruling or screen angle is defined is preferable in superimposing, rather than an AM screen having halftone dots with the screen ruling and screen angle being uniquely determined. It is known that shortcomings due to a periodic pattern in superimposing the plates do not often occur when such dot patterns representative of a v-valued image are used.

When v-valued images in which no screen ruling or screen angle are defined are generated using a threshold matrix and the same threshold matrix is used for J color plates for multiple colors, however, shortcomings occur in the image as follows. When one plate is completely superimposed on another plate without displacement, colored portions by these plates are precisely generated. However, when one plate is not completely superimposed on another plate with some displacement, less superimposition of dots causes unstable color reproduction and unevenness or irregularity of hue or shade in the image. Thus, when the same threshold matrix is used for J plates for multiple colors, shortcomings due to displacement in an output system such as a filmsetter will occur in the image.

Therefore, when a color image is reproduced in five or more colors, it is preferable that threshold matrixes each having a different threshold array is generated for each plate. However, it is quite difficult to generate threshold matrixes each having a different threshold array, and it requires a heavy workload. Further, it is difficult to handle five or more thresholds for color plates in a RIP system etc. generally using four threshold matrixes for four C, M, Y and K colors.

SUMMARY OF THE INVENTION

It is an object of the present invention to provide a threshold matrix and a method of generating such a threshold matrix which will solve the problems of the conventional FM screens. The generated threshold matrix is optimum for use in an output system, and is capable of reproducing high-quality images of excellent printability.

Another object of the present invention is to provide a method of assigning a threshold matrix which is capable of generating threshold matrixes for five or more color separations for reproducing a color image with a light workload, and which is capable of generating threshold matrixes that do not cause shortcomings in superimposing images.

According to the present invention, there is provided a method of generating a threshold matrix for converting a continuous-tone image into a dot pattern representing a binary image, the method comprising the steps of: determining a size of the threshold matrix; determining the number of pixels of a dot of a minimum size; determining a pattern frequency at a dot percentage of an intermediate tone; determining candidate positions for the dots of the minimum size in a dot pattern so that the pattern frequency is provided at the dot percentage; determining the number of new dots of the minimum size at a next dot percentage with respect to a present dot percentage for which a dot pattern has been determined; and determining placement positions of thresholds in the threshold matrix so that the dot pattern corresponding to the next dot percentage is obtained by conversion with the threshold matrix, the dot pattern made up of dots in which the number of pixels is adjusted, the step of determining the placement positions of the thresholds comprising the steps of: determining candidate positions for placing the thresholds based on the candidate positions for the dots of the minimum size in a dot pattern at the next dot percentage and the number of new dots of the minimum size at the next dot percentage; and thereafter determining the placement positions of the thresholds by adjusting the number of pixels of each of the dots so that the dot pattern has the next dot percentage.

In the present invention, the number of pixels of a dot of a minimum size and a pattern frequency at a dot percentage of an intermediate tone are determined. Based on the number of pixels of a dot of a minimum size and a pattern frequency, candidate positions for the dots in the dot pattern for highlight areas and shadow areas so that the pattern frequency is provided at the dot percentage. Then, the number of new dots of the minimum size is determined at a next dot percentage with respect to a present dot percentage for which the dot pattern has already been determined. Subsequently, the number of pixels of each of the dots is adjusted, i.e., increased or decreased so that the dot pattern has the next dot percentage. Finally, each of the thresholds is set so that the dot pattern whose number of pixels is adjusted is generated. Thus, the generated threshold matrix is optimum for use in an output system.

In this case, the step of determining the candidate positions for the dots in the dot pattern may comprise the steps of: determining the dot pattern of the intermediate tone so that the dot pattern has the pattern frequency; and using the determined dot pattern of the intermediate tone as the candidate positions for the dots of the minimum size in the dot pattern at the next dot percentage.

The intermediate tone has dot percentages in a range from 10% to 90%.

The step of determining the number of the new dots of the minimum size at the next dot percentage comprises the steps of: in a dot percentage range from 0% to 50%, determining the number of the new dots such that the number of the dots in the dot pattern is gradually reduced from the number of the dots corresponding to an ideal FM screen in a dot percentage range from 0% to a certain percentage; and determining the number of the new dots such that the number of the new dots is zero in a dot percentage range from the certain percentage to 50%.

Further, the step of determining the number of the new dots of the minimum size at the next dot percentage comprises the steps of: in a dot percentage range from 0% to 50%, determining the number of the new dots such that the number of the dots in the dot pattern is gradually reduced from the number of the dots corresponding to an ideal FM screen in a dot percentage range from 0% to a first percentage; determining the number of the new dots such that the number of the new dots is zero in a dot percentage range from the first percentage to a second percentage; and determining the number of the new dots such that the number of the dots in the dot pattern is gradually increased in a dot percentage range from the second percentage to 50%. Accordingly, a predetermined pattern frequency can be obtained in intermediate tones, and the dot pattern whose dot gain is small can be obtained.

In adjusting the number of pixels, low-frequency components may be extracted from the dot pattern that is generated by a threshold matrix having thresholds whose placement positions have already been determined. When the pixel count is smaller than a required pixel count, the placement positions of thresholds may be adjusted so that a pixel is added to the existing dots in positions where the extracted low-frequency components are weakest. When the pixel count is larger than the required pixel count, the placement positions of thresholds may be adjusted so that a pixel is deleted from the existing dots in positions where the extracted low-frequency components are strongest.

When low-frequency components are extracted from the dot pattern, it is preferable to use a human visual characteristic filter. Further, a density image (density dot pattern) corresponding to a dot pattern reproduced on a recording medium such as a film, a printing plate, or printing paper may be predicted by calculating based on the shape of the laser beam and the characteristics of photosensitive material. Then, low-frequency components may be extracted from the predicted density image (density dot pattern).

According to the present invention, there is provided a threshold matrix for converting a continuous-tone image into a dot pattern representing a binary image, the threshold matrix having a matrix size of N×M (N=M included), wherein an output system has an output resolution R pixels/mm and a dot pattern generated from continuous-tone image data whose pixel values correspond to a dot percentage of 50% as binary data has a pattern frequency r c/mm, the dot pattern is generated such that dots of a predetermined minimum size which are made up of n pixels (n is at least 1) are placed out of contact with each other at dot percentages from 0% to a certain percentage where the number of dots becomes nearly $N \times M/(R/r)^2$, and the dot pattern is generated such that pixels are attached to a periphery of existing dots of the minimum size and that the number of dots is not increased at dot percentages more than the certain dot percentage where the number of the dots becomes nearly $N \times M/(R/r)^2$.

According to the present invention, in intermediate tones, the increase in the dot periphery length is suppressed compared with a conventional FM screen. Thus, dot gain is reduced, and the threshold matrix is optimum for use in an output system, and reproducing high-quality images of excellent printability is achieved.

With a threshold matrix for converting a continuous-tone image into a dot pattern representing a binary image, the threshold matrix having a matrix size of N×M (N=M included), wherein an output system has an output resolution R pixels/mm and a dot pattern generated from continuous-tone image data whose pixel values correspond to a dot percentage of 50% as binary data has a pattern frequency r c/mm, the dot pattern is generated such that dots of a predetermined minimum size which are made up of n pixels (n is at least 1) are placed out of contact with each other at dot percentages from 0% to a certain percentage where the number of dots becomes nearly $N \times M/(R/r)^2$, and the dot pattern is generated such that pixels are attached to a periphery of existing dots of the minimum size to adjust the dot areas. When the existing dots contact each other, the dot pattern is generated by the threshold matrix such that new dots of the minimum size will be increased until the number of the dots becomes a certain value that corresponds to the pattern frequency r. Then, the pattern frequency is substantially held in the intermediate tones. Thus, the threshold matrix that is capable of generating a dot pattern having a pattern frequency close to a target pattern frequency can be obtained.

In the method of generating a threshold matrix according to the present invention, the number of pixels of a dot of a minimum size, a pattern frequency of an intermediate tone, the number of new dots of the minimum size at each dot percentage are determined. Based on these, placement positions for thresholds in the threshold matrix are successively determined, and the threshold matrix that is optimum for use in an output system can be generated.

When the predetermined number of pixels of a dot of a minimum size is set, the image can be stably reproduced for highlight areas, suitability for output and printability can be improved, and high-quality images can be reproduced at all dot percentages. At the same time, since the pattern frequency is set to a sufficiently small value without large values, the threshold matrix that generates a dot pattern having suitability for output without sudden rise in dot gains can be generated.

Specifically, the generated threshold matrix is capable of generating an image where dots are reliably and solidly assigned to a highlight area, and where graininess is reduced and a dot gain is small in an intermediate tone area.

The threshold matrix may be stored in a storage unit as data.

Further, a raster image processor may have the storage unit for storing the threshold matrix as data.

According to the present invention, there is provided a method of assigning threshold matrixes to color separations, each of the threshold matrixes converting continuous-tone image data into dot pattern image data, the continuous-tone image data comprising at least data for J colors (J≧5) including C, M, Y and K, the dot pattern image data comprising data for J color separations in which screen ruling or screen angle is not defined, the method comprising the steps of: assigning a first threshold matrix with a first threshold array to a first separation for a first color, the first color being K; assigning a second threshold matrix with a second threshold array to a second separation for a second color other than K; and assigning a third threshold matrix with a third threshold array to a third separation for a third color, the third color being adjacent to the second color in a hue circle, the number of the threshold matrixes assigned to the J color separations being as small as possible.

The three different threshold matrixes are assigned to a separation for K-color, a separation for another color other than K, and a separation for the color adjacent to the other color in the hue circle, respectively. In the hue circle, generally, a color component of a substantially fan-shaped area defined by boundaries of K-color, the color other than K, and the color adjacent to the other color can be reproduced by mixing these three colors. When threshold matrixes having different threshold arrays are used for these three colors to be mixed, excessive overlapping of dots are avoided and shortcomings due to superimposition of images can be prevented. In assigning threshold matrixes, if the number of the threshold matrixes is made as small as possible on condition that the threshold matrixes for adjacent colors are not the same as each other, workload of generating the threshold matrixes can be reduced.

For example, the J color separations are made up of a C-separation, an M-separation, a Y-separation, a K-separation, an R-separation, a G-separation and a B-separation. In the hue circle, C is adjacent to G, G is adjacent to Y, Y is adjacent to R, R is adjacent to M, M is adjacent to B, and B is adjacent to C. Then, the second threshold matrix is assigned to one of the C-separation, Y-separation and the M-separation. In the hue circle, C is not adjacent to Y, Y is not adjacent to M, and M is not adjacent to C. The third threshold matrix is assigned to the G-separation, R-separation and the B-separation, and in the hue circle, G is not adjacent to R, R is not adjacent to B, and B is not adjacent to G. Accordingly, for the separations for the colors of C, M, Y, K, R, G and B, only three threshold matrixes each having a different threshold array are sufficient. The workload of generating the threshold matrixes can be reduced. In this way, it is possible to handle threshold matrixes for separations for C, M, Y, K, R, G and B colors in a RIP system etc. generally using four threshold matrixes for four separations for C, M, Y and K colors.

Further, for example, the J color separations are made up of a C-separation, an M-separation, a Y-separation, a K-separation, an O-separation and a G-separation. In the hue circle, C is adjacent to G, G is adjacent to Y, Y is adjacent to O, O is adjacent to M, and M is adjacent to C. Then, the second threshold matrix is assigned to the C-separation, the third threshold matrix is assigned to the G-separation, the second threshold matrix is assigned to the Y-separation, the third threshold matrix is assigned to the O-separation, and a fourth threshold matrix with a fourth threshold array is assigned to the M-separation. If the second threshold matrix is assigned to the M-separation, the threshold matrix for the M-separation is the same as the threshold matrix for the C-separation, which is undesirable. Accordingly, for the separations for the colors of C, M, Y, K, O and G, only four threshold matrixes each having a different threshold array are sufficient. The workload of generating the threshold matrixes can be reduced. In this way, it is possible to handle threshold matrixes for separations for C, M, Y, K, O and G colors in a RIP system etc. generally using four threshold matrixes for four separations for C, M, Y and K colors.

According to the present invention, there is provided a method of assigning threshold matrixes to color separations, each of the threshold matrixes converting continuous-tone image data into dot pattern image data, the continuous-tone image data comprising at least data for J colors (J≧5) including C, M, Y and K, the dot pattern image data comprising data for J color separations in which screen ruling or screen angle is not defined, the method comprising the step of: assigning a first threshold matrix to a separation for a color other than C, M, Y or K, the first threshold matrix being different from a threshold matrix for C, M or Y that is adjacent to the color in a hue circle.

In the present invention, the number of the threshold matrixes for reproducing a color image with five or more color separations may generally be four, i.e., the threshold matrixes for the C-separation, the M-separation, the Y-separation and the K-separation. Thus, the threshold matrixes that do not cause shortcomings in superimposing images can be generated and assigned with a light workload.

According to the present invention, there is provided a method of assigning threshold matrixes to color separations, each of the threshold matrixes converting continuous-tone image data into dot pattern image data, the continuous-tone image data comprising at least data for J colors (J≧5) including C, M, Y and K, the dot pattern image data comprising data for J color separations in which screen ruling or screen angle is not defined, the method comprising the steps of: assigning a first threshold matrix with a first threshold array to a K-separation; and assigning a second threshold matrix with a second threshold array to separations for colors other than K, the colors other than K being complementary to each other.

Even if threshold matrixes having the same threshold array are used for separations for the hues that are complementary to each other, unstable color reproduction or unevenness or irregularity of hue or shade in the image due to less superimposition of dots by screen displacement does not occur. This is because the colors that are complementary to each other are seldom mixed. If the colors that are complementary to each other are mixed, the mixed color is merely gray. Further, workload of generating the threshold matrixes can be reduced.

In this case, for example, the J color separations are made up of a C-separation, an M-separation, a Y-separation, a K-separation, an R-separation, a G-separation and a B-separation. The second threshold matrix is assigned to the C-separation, a third threshold matrix is assigned to the M-separation, and a fourth-threshold matrix is assigned to the Y-separation. In the hue circle, C is adjacent to G, G is adjacent to Y, Y is adjacent to R, R is adjacent to M, M is adjacent to B, and B is adjacent to C. Then, the third threshold matrix for the M-separation is assigned to the G-separation, the second threshold matrix for the C-separation is assigned to the R-separation, and the fourth threshold matrix for the Y-separation is assigned to the B-separation, since G is complementary to M, R is complementary to C, and B is complementary to Y. Accordingly, for the separations for the colors of C, M, Y, K, R, G and B, only four threshold matrixes each having a different threshold array, e.g., for four separations generally for C, M, Y and K colors are sufficient. Thus, workload of generating the threshold matrixes can be reduced.

Further, for example, the J separations are made up of a C-separation, an M-separation, a Y-separation, a K-separation, an O-separation and a G-separation. The second threshold matrix is assigned to the C-separation, a third threshold matrix is assigned to the M-separation, and a fourth threshold matrix is assigned to the Y-separation. In the hue circle, C is adjacent to G, G is adjacent to Y, Y is adjacent to O, O is adjacent to M, and M is adjacent to C. Then, the third threshold matrix for the M-separation is assigned to the G-separation, and the second threshold matrix for the C-separation is assigned to the O-separation, since G is complementary to M, and O is complementary to C. Accordingly, for the separations for the colors of C, M, Y, K, O and G, only four threshold matrixes each having a different threshold array, e.g., for four separations generally for C, M, Y and K colors are sufficient. Thus, workload of generating the threshold matrixes can be reduced.

Further, one of the threshold matrixes is generated by changing a reading method of thresholds placed in the threshold array in other of the threshold matrixes. Thus, a threshold array in the threshold matrix can be changed, and time for generating a threshold matrix can be significantly reduced, compared with a threshold matrix generated from nothing.

Further, when the sizes of the threshold matrixes for the C-separation, the M-separation, the Y-separation and the K-separation are different from each other, unnecessary periodic pattern in the dot pattern can be reduced.

In the present invention, threshold matrixes are generated for five or more color separations for reproducing a color image with dot patterns in which screen ruling or screen angle is not defined. In assigning the threshold matrixes to the separations, the threshold matrixes each having a different threshold array are used for the separations for hues that are adjacent to each other in a hue circle, and the number of the threshold matrixes is made as small as possible. Thus, the threshold matrixes can be generated and assigned with a light workload.

Further, in the present invention, threshold matrixes are generated for five or more color separations for reproducing a color image with dot patterns in which screen ruling or screen angle is not defined. In assigning the threshold matrixes to the separations, threshold matrixes having the same threshold array are assigned to separations for hues that are complementary to each other in a hue circle. Thus, the threshold matrixes can be generated with a light workload, and assigned so as not to cause shortcomings in superimposing images.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing the number of dots vs. dot percentage;

FIG. 11A is a diagram showing a dot pattern having a dot percentage of 10% which is generated by the threshold matrix according to the embodiment;

FIG. 11B is a diagram showing a dot pattern having a dot percentage of 20% which is generated by the threshold matrix according to the embodiment;

FIG. 11C is a diagram showing a dot pattern having a dot percentage of 30% which is generated by the threshold matrix according to the embodiment;

FIG. 11D is a diagram showing a dot pattern having a dot percentage of 40% which is generated by the threshold matrix according to the embodiment;

FIG. 11E is a diagram showing a dot pattern having a dot percentage of 50% which is generated by the threshold matrix according to the embodiment;

FIG. 11F is a diagram showing a dot pattern having a dot percentage of 70% which is generated by the threshold matrix according to the embodiment;

FIG. 16 is a diagram showing how another threshold matrix is generated from the original threshold matrix;

FIG. 24 is a diagram showing a power spectrum generated when the dot pattern at the dot percentage of 50% of the 3×3 pixel FM-screened dots is processed by FFT.

DESCRIPTION OF THE PREFERRED EMBODIMENTS

In the description, a method of generating a threshold matrix is described first, and then a method of assigning a threshold matrix is described.

Figure 1:
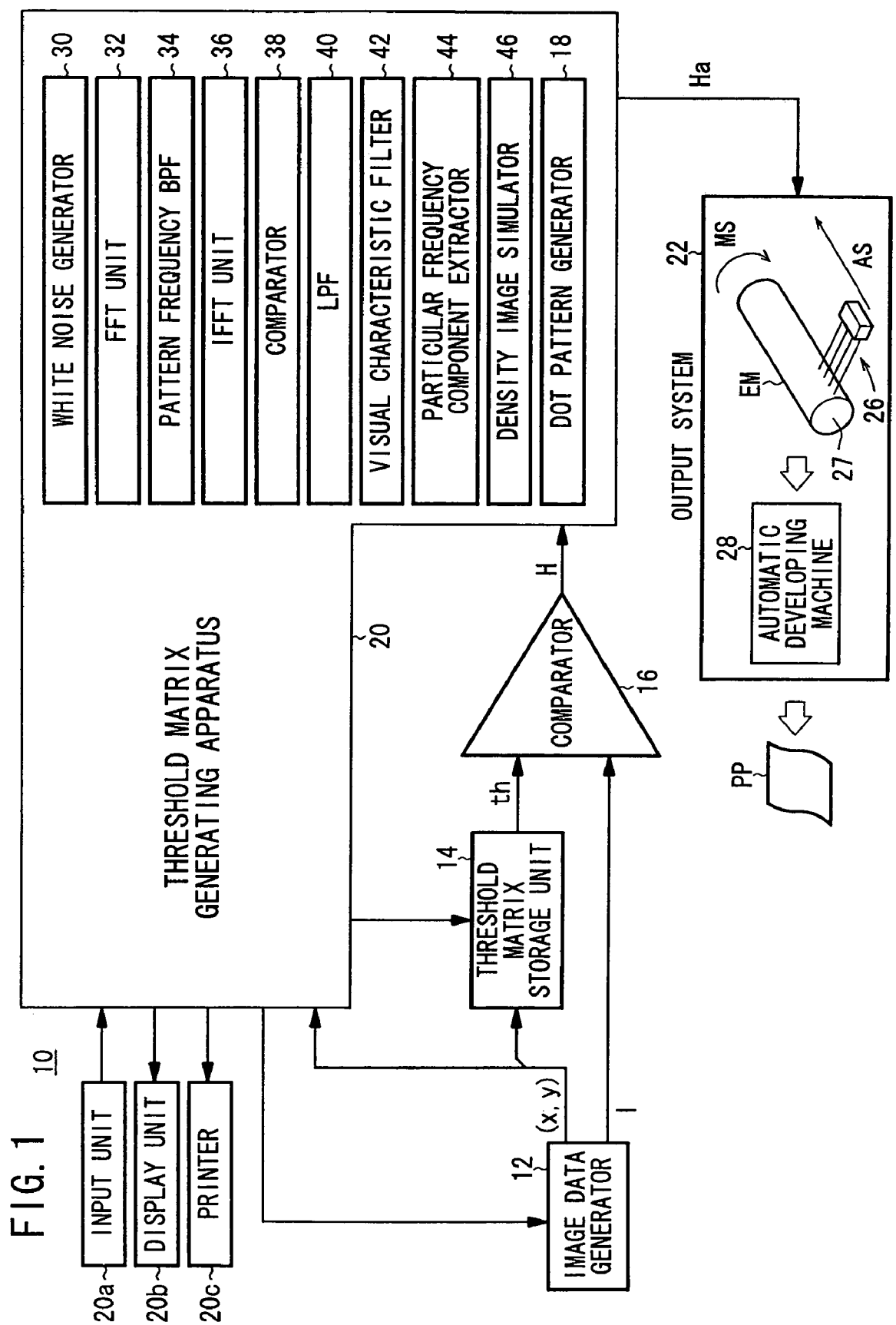
FIG. 1 is a block diagram of a threshold matrix generating system to which a process of generating a threshold matrix according to an embodiment of the present invention is applied.

FIG. 1 shows a basic arrangement of a threshold matrix generating system 10 according to an embodiment of the present invention.

As shown in FIG. 1, the threshold matrix generating system 10 has an image data generator 12 for generating continuous-tone image data I including a test pattern of uniform density with a tone value u (for example, u=256) and also generating a two-dimensional address (x, y) of the image data I, a threshold matrix storage unit 14 for storing a plurality of threshold matrixes TM (or TMX, TX) and outputting a threshold th read by the address (x, y), a comparator 16 for comparing the threshold th and the image data I and outputting binary image data H representative of a dot pattern in which no predetermined screen ruling or screen angle is defined, a threshold matrix generating apparatus 20 including a dot pattern generator 18 for generating dot pattern data Ha corresponding to the binary image data H output from the comparator 16, the threshold matrix generating apparatus 20 serving to determine a threshold array (threshold positions) of the threshold matrixes TM such that a dot pattern represented by the dot pattern data Ha will be a desired dot pattern, and an output system 22 for forming the dot pattern corresponding to the dot pattern data Ha on a film, a printing plate PP, or a printed material.

The threshold matrixes TM generated by the threshold matrix generating apparatus 20 are a threshold matrix for an FM screen, for example, to convert the continuous-tone image data I with the tone value u into the dot pattern in which no predetermined screen ruling or screen angle is defined.

The threshold matrix storage unit 14 comprises a recording medium such as a hard disk or the like. The image data generator 12, the comparator 16, the dot pattern generator 18, and the threshold matrix generating apparatus 20 may comprise function realizing means that are achieved when a program stored in a personal computer (including a CPU, a memory, an input unit 20a such as a keyboard, a mouse, etc., and an output unit such as a display unit 20b, a printer 20c, etc.) is executed by the computer. The function realizing means of the threshold matrix generating apparatus 20 may comprise a piece of hardware. An arrangement and operation of the function realizing means of the threshold matrix generating apparatus 20 will be described later on.

In the present embodiment, the output system 22 basically comprises a CTP apparatus having an exposure unit 26 and a drum 27 with printing plate materials EM wound thereon. The exposure unit 26 applies a plurality of laser beams (recording beams), which are turned on and off for each pixel depending on the dot pattern data Ha, to the printing plate materials EM on the drum 27 that is being rotated in a main scanning direction MS by a main scanning motor (not shown) at a high speed, while the exposure unit 26 is being moved in an auxiliary scanning direction AS along the axis of the drum 27 by an auxiliary scanning motor (not shown). At this time, a dot pattern representing a two-dimensional image as a latent image is formed on each of the printing plate materials EM. The laser beams applied to the printing plate materials EM may be in several hundred channels.

The printing plate materials EM (usually, four printing plate materials with different screen angles for C, M, Y, K printing plates) on which the dot patterns are formed as latent images are developed by an automatic developing machine 28, producing printing plates PP with visible dot patterns formed thereon. The produced printing plates PP are mounted on a printing press (not shown), and inks are applied to the mounted printing plates PP.

The printing plate materials EM contain a photosensitive material which should preferably be a positive image recording material including an alkaline dissolvable binder, a substance for generating heat upon absorption of an infrared radiation or a near-infrared radiation, and a thermally decomposable substance for substantially lowering the dissolvability of the binder when not thermally decomposed, as disclosed in Japanese Patent No. 3461377. The printing plates PP should preferably be made of an image recording material including a photosensitive material which comprises a support base such as an aluminum sheet, a polyester film, or the like, and a layer including the above substances and mounted on the support base.

The alkaline dissolvable binder contains a phenolic resin, an acrylic resin, or a polyurethane resin. The substance for generating heat upon absorption of an infrared radiation or a near-infrared radiation comprises a dye, a pigment, or carbon black. The thermally decomposable substance for substantially lowering the dissolvability of the binder when not thermally decomposed comprises onium salt, diazonium salt, or a substance containing a quinone diazide compound.

When the inks applied to the printing plates PP are transferred to a printing sheet as a recording medium such as a photographic sheet or the like, a desired printed material comprising an image formed on the printing sheet is obtained.

The output system 22 is not limited to the scanning exposure apparatus employing laser beams, but may be an apparatus for forming an image on a film, a printing plate, or a printed material according to a planar exposure process or an ink jet process, or a CTC printing machine.

The threshold array of the threshold matrixes TM stored in the threshold matrix storage unit 14 can be recorded and carried around in a portable recording medium which is a packaged medium such as a DVD, a CD-ROM, a CD-R, a semiconductor memory, or the like.

A process of generating a threshold matrix using the threshold matrix generating system shown in FIG. 1 will be described below with reference to a flowchart of FIG. 2. The process shown in FIG. 2 is based on a program which is mainly executed by the threshold matrix generating apparatus 20.

Figure 2:
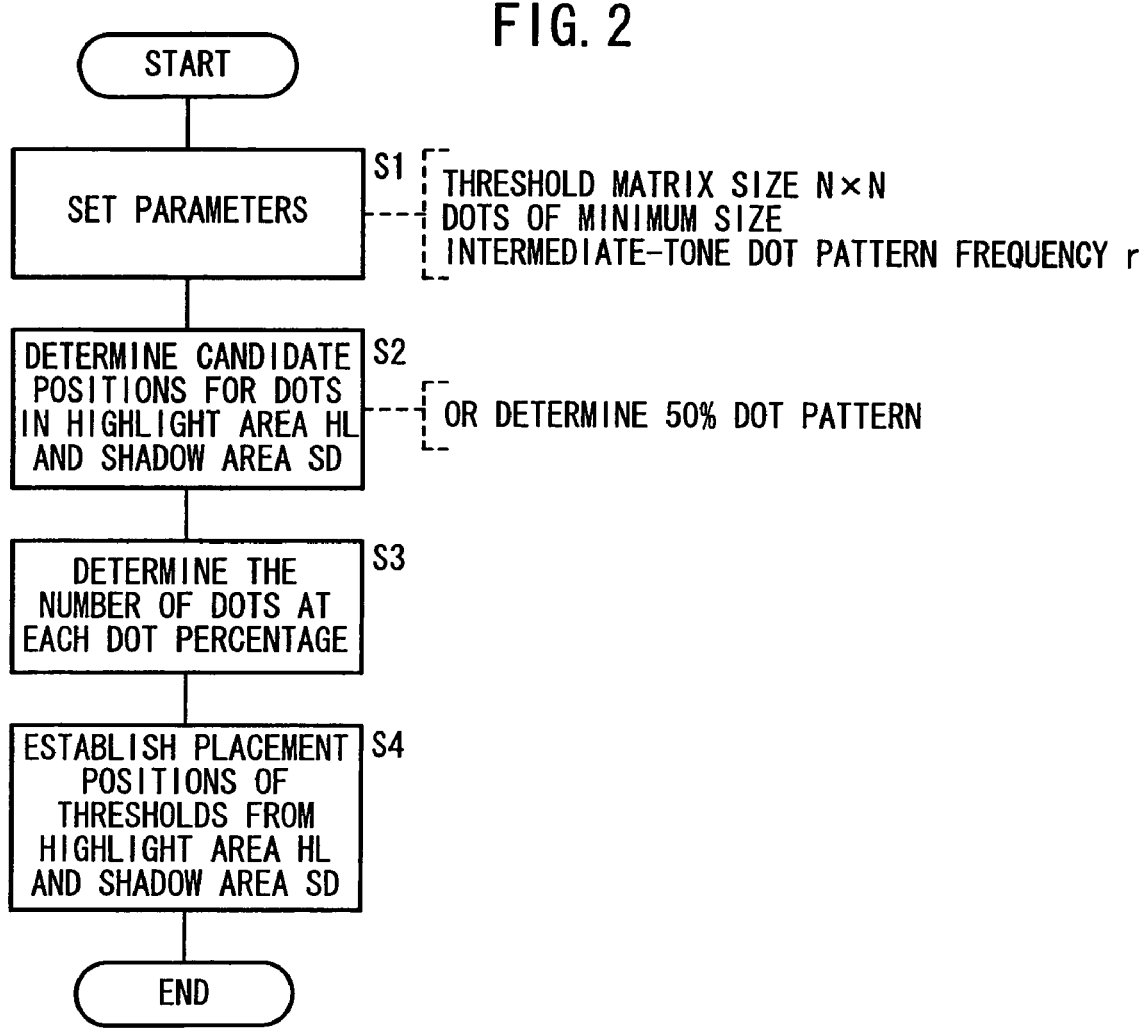
FIG. 2 is a flowchart of an overall sequence of the process of generating a threshold matrix which is carried out by the threshold matrix generating system shown in FIG. 1.

In step S1 shown in FIG. 2, three parameters are set. The first parameter represents the size of a threshold matrix TM to be stored in the threshold matrix storage unit 14, i.e., the size N×N of a threshold matrix TM which contains N×N thresholds corresponding to N×N pixels. The threshold matrix TM contains thresholds th ranging from 0 to thmax at respective positions (elements) determined by addresses (x, y). The maximum threshold thmax has a value that is set to "255" for a system having 8-bit gradations and "65535" for a system having 16-bit gradations. The size N×N of a square threshold matrix will be described below. However, the present invention is also applicable to the size N×M of an elongate rectangular threshold matrix. Actually, a plurality of threshold matrixes TM having the same threshold array and matrix size N×N and laid out as tiles (referred to as a superthreshold matrix STM) are used depending on the size of an image to be processed. The thresholds th of the threshold matrix TM is determined in view of the threshold array of the entire superthreshold matrix STM.

In the present embodiment, the size of a pixel that can be output from the output system 22 is represented by 10 μm×10 μm, which corresponds to a 1×1-pixel dot or 1 pixel. The size 10 μm×10 μm is a minimum unit that can be controlled by the exposure unit 26 for recording image data on the printing plate materials EM.

The second parameter represents the number of pixels that make up a dot of a minimum size which can stably be output from the output system 22, or stated otherwise, can stably be formed on the printing plates PP which are output from the output system 22. The dot of a minimum size may be set to a 1-pixel dot (the number of pixels that make up a dot of a minimum size is one), a 2-pixel dot, a 3-pixel dot, a 2×2-pixel (the number of pixels that make up a dot of a minimum size is four) dot, a 2×3-pixel (6-pixel) dot, a 3×3-pixel (9-pixel) dot, etc. In the present embodiment, it is assumed that a dot of a minimum size that can stably be formed on the printing plates PP (in reality, the printed material) is a 2×2-pixel dot whose dot size is represented by 2×2=4 pixels.

The third parameter represents the pattern frequency at a predetermined dot percentage (also referred to as density percentage) in intermediate tones having a dot percentage in the range from 10% to 50%, i.e., the pattern frequency r of an intermediate tone dot pattern. The pattern frequency r of an intermediate tone dot pattern represents the peak spatial frequency fpeak c/mm of a dot pattern in an intermediate tone.

In reality, the peak spatial frequency fpeak is concerned with the reproduction of image details, and also affects image quality in terms of grainness. In the present embodiment, the pattern frequency r is set to a visually sufficiently small value of 20 c/mm, i.e., 508 (20×25.4) LPI (Line Per Inch) (fpeak=r=20 c/mm).

In step S2, a dot candidate position in a highlight area HL and a dot candidate position in a shadow area SD are determined to provide the pattern frequency r in an intermediate tone.

Figure 3A:
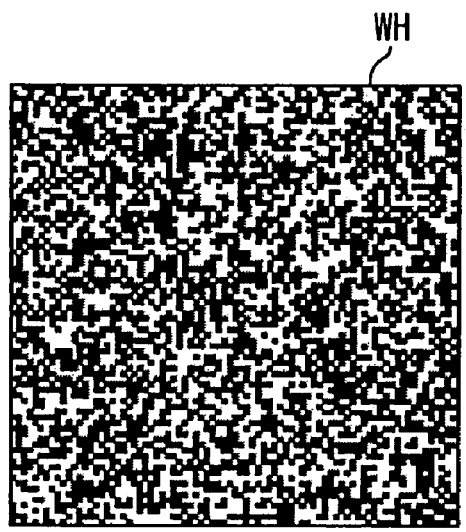
FIG. 3A is a diagram of a white noise pattern generated at a dot percentage of 50% by 1×1 pixel FM-screened dots.

First, as shown in FIG. 3A, a white noise generator 30 generates a white noise pattern WH at a dot percentage of 50% having the same size N×N as the size N×N of the threshold matrix TM. The white noise pattern WH is an image where 1-pixel dots are randomly positioned in a spatial domain. The white noise pattern WH can be generated so as to have desired values in an intermediate tone having a dot percentage in the range from 10% to 90%.

Figure 3B:
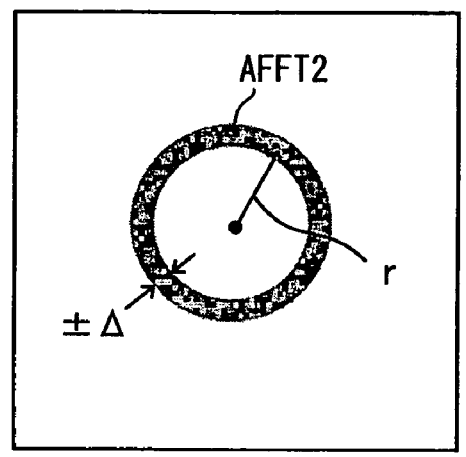
FIG. 3B is a diagram showing an FFT process and a band-pass filtering process on the white noise pattern.

Second, the white noise pattern WH is FFTed by an FFT (Fast Fourier Transform) unit 32, and then subjected to a bandpass filtering process at the pattern frequency r (±Δ) by a pattern frequency bandpass filter (pattern frequency BPF) 34, producing ring-shaped frequency-domain data AFFT2 having a radius equal to the pattern frequency r, as shown in FIG. 3B.

Figure 3C:
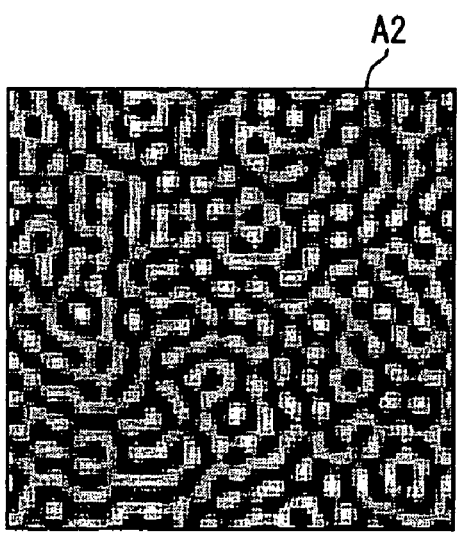
FIG. 3C is a diagram showing an IFFT-processed space-domain image converted from the frequency-domain image shown in FIG. 3B.

Third, the frequency-domain data AFFT2 is IFFTed by an IFFT (Inverse Fast Fourier Transform) unit 36, producing space-domain data A2 of a continuous-tone image, as shown in FIG. 3C.

Figure 3D:
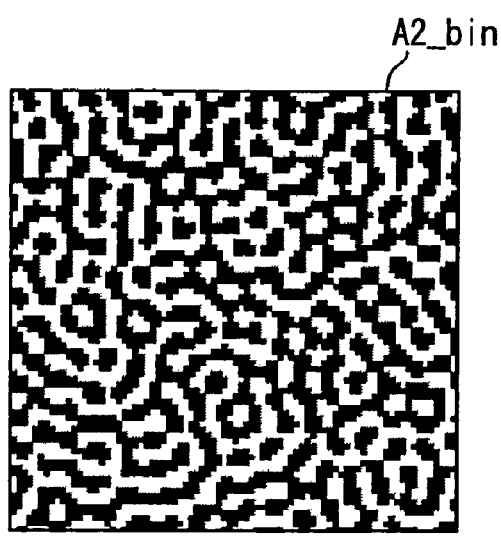
FIG. 3D is a diagram showing a binary image converted from the space-domain image shown in FIG. 3C.

Fourth, the value of each of the pixels of the spatial-domain data A2 is compared with a central gradation value (e.g., 127 if the maximum gradation is 255) by a comparator 38, generating binary data A2_bin, as shown in FIG. 3D.

Of the binary data A2_bin, blackened portions (areas) serve as dot candidate positions in highlight areas HL and white portions (areas) serve as dot candidate positions in shadow areas SD.

The binary data A2_bin represent candidate positions for placing dots in highlight areas HL or the shadow areas SD. The pattern of the binary data A2_bin may not necessarily be produced when the dot percentage is 50%. When the binary data A2_bin do not actually represent an optimum 50% dot pattern, the pattern may be changed for achieving the optimum dot pattern.

However, a 50% dot pattern can be established when a characteristic dot pattern is to be used at the dot percentage of 50% or when the dot pattern corresponding to the binary data A2_bin can be corrected into an optimum 50% dot pattern.

Then, in step S3, the number Dn of dots of a minimum size (also referred to as the number of dots of a new minimum size dots or the number of new dots of a minimum size) to be newly set at a present dot percentage is determined with respect to the dot percentage for which a dot pattern has been determined. The number Dn(P) of new dots of a minimum size to be established at each dot percentage P % is expressed as Dn(P)=Ds(P)−Ds(P−1) where Ds(P) represents the number of accumulated dots (accumulated values) at each dot percentage P.

Specifically, in step S3, when candidate positions for dots are successively determined as the dot percentage is incremented, the number Dn(P) of dots of a minimum size to be newly established at a present dot percentage P is determined with respect to the preceding dot percentage P−1 for which a dot pattern has already been determined.

When a dot pattern has a dot percentage P with respect to the size N×N of a threshold matrix TM, the total number of blackened pixels in the dot pattern corresponding to the size N×N of the threshold matrix TM is calculated as N×N×P/100. If all the dots of a dot pattern comprise only dots of a minimum size as 2×2 (n=4)-pixel dots, then since the number of dots of a minimum size at each dot percentage P is expressed as Ds(P)=(N×N×P/100)/n, it is given as (N×N×P/100)/n (n=4), as indicated by a solid straight curve na in FIG. 4, for example.

At this time, the number Dn(P) of dots of a minimum size to be newly established at each dot percentage P is expressed as Dn(P)=Ds(P)−Ds(P−1)=(N×N/100)/n.

The vertical axis of the graph shown in FIG. 4 represents a calculated accumulated value Ds of the number Dn of dots of a minimum size to be newly established (the number of new dots). Actually, as the dot percentage P becomes greater than 25%, since adjacent dots of a minimum size become closer to each other, the actual number of dots in a dot pattern is smaller than the accumulated value of the number Dn of new dots shown in FIG. 4.

If the number Dn of new dots are determined at each dot percentage according to the solid straight curve na in FIG. 4 which represents the accumulated value of the number Dn of new dots, then the threshold matrix produces a conventional FM screen, which causes disadvantages in that a dot gain tends to become large and images are reproduced unstably when images are printed or films are output in an intermediate printing process.

According to an embodiment of the present invention, in view of the fact that the pattern frequency is low in highlight areas where the dot percentage is less than 10%, all dots comprise dots of a minimum size in those highlight areas. In intermediate tone areas where the dot percentage ranges from 10% to 50%, the size of dots is increased from the minimum size, e.g., dots composed of 5 pixels (2>2+1) or more are used. Specifically, in a dot percentage range from 10% to 25%, the number Dn of new dots to be established at each dot percentage is gradually reduced, as indicated by a broken-line curve nc which represents the accumulated value of the number of new dots. In a dot percentage range from 25% to 50%, the number Dn of new dots to be established at each dot percentage is set to zero. Alternatively, the number Dn is gradually increased, as indicated by the dot-and-dash-line curve nb which represents the accumulated value of the number of new dots.

In the present embodiment, since the output resolution R of the output system is 100 pixels/mm or 10 μm/pixels, and the pattern frequency r of the intermediate tone dot pattern is r=20 c/mm, each side of the N×N-pixel area has to contain 20 blackened dots (one dot comprises 2×2 pixels with r c/mm) of a minimum size, each composed of 4 pixels per 100 pixels/mm (R pixels/mm). In terms of the size of the N×N-pixel threshold matrix TM, the accumulated value Ds of the number Dn of new dots up to the intermediate tone areas is represented by $(N/(R/r))^2 = N \times N \times (r/R)^2 = N \times N \times (20/100)^2 = N \times N \times 0.04$.

With the above settings, in the intermediate tone areas where the dot percentage ranges from 10% to 50%, the total number of pixels of a dot pattern generated by the threshold matrix TM at each dot percentage is the same as with the conventional FM screens, i.e., the dot percentage is the same, but the number of dots is smaller than with the conventional FM screens. Therefore, a periphery length representing the sum of the lengths of the peripheries of all the dots of the dot pattern is smaller than with the conventional FM screens.

Figure 5A:
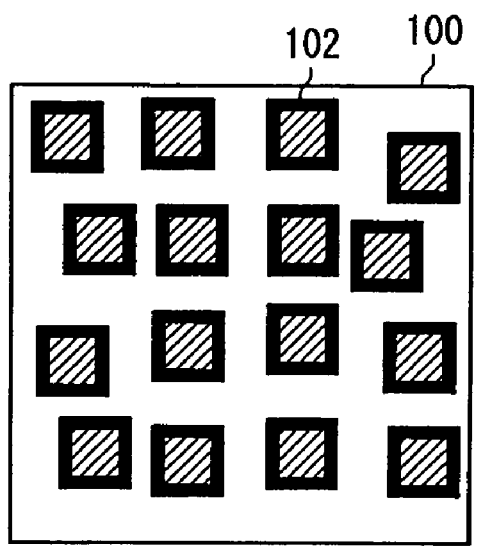
FIG. 5A is a diagram showing a periphery length of small dots.
Figure 5B:
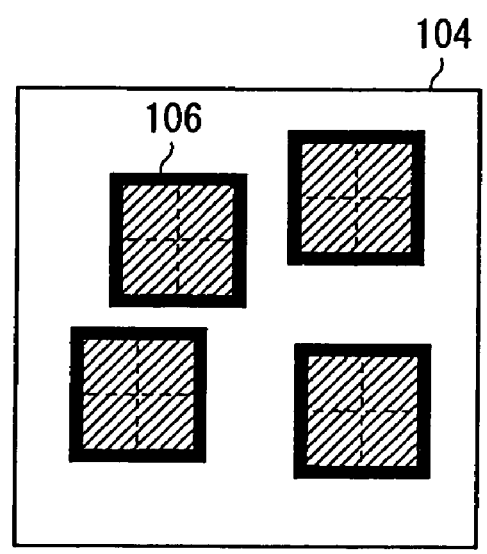
FIG. 5B is a diagram showing a periphery length of large dots at the same dot percentage as with FIG. 5A.

In the present description, regarding the periphery length, for example, as can be seen from dot patterns 100, 104 having the same area shown in FIGS. 5A and 5B, the dot pattern 100 contains sixteen 1×1-pixel dots 102. The dot pattern 104 contains four 2×2-pixel dots 106. Though the total area of the dots 102 of the dot pattern 100 and the total area of the dots 106 of the dot pattern 104 are the same as each other, the dot patterns 100, 104 have different periphery lengths. Stated otherwise, though the dot pattern 100 and the dot pattern 104 have the same dot percentage, the sum of the lengths of white/black boundaries per unit area of the dot pattern, i.e., the dot periphery length of the dot pattern 100, is twice as long as the periphery length of the dot pattern 104. Specifically, the dot periphery length of the dot pattern 100 is calculated as 16 (dots)×4=64 while the dot periphery length of the dot pattern 104 is calculated as 4 (dots)×8=32.

If the relationship of the accumulated value Ds of the number Dn of dots with respect to the dot percentage is established according to the curve nc, then an increase in the dot gain in the intermediate tone areas is made smaller than with an FM screen where the accumulated value Ds is established according to the curve na. In addition, a sufficient resolution is provided in all the range of dot percentages as with the conventional FM screens. If the number Dn of new dots in the intermediate tone areas is not increased according to the curve nc, i.e., is unduly reduced, then each dot becomes so large as to make graininess visible, lowering the quality of images, with the result that the pattern frequency of the dot pattern becomes coarse.

Specifically, even if the number Dn of new dots is established at each dot percentage according to the curve nc, when the dot percentage exceeds 25%, adjacent dots start contacting each other, and the accumulated value Ds of the number Dn of dots according to the curve nc is not reached.

Actually, therefore, as indicated by the dot-and-dash-line curve nb which represents the accumulated value of the number of new dots in FIG. 4, the number Dn of new dots of a minimum size is established such that it increases again a substantially constant number after the dot percentage exceeds 25% and until it reaches 50%. According to the curve nb, dots are prevented from contacting each other in the vicinity of the dot percentage of 50%, thus avoiding the occurrence of a tone jump.

In the dot percentage range from 50% to 100%, the accumulated value Ds of the number Dn of new dots may be established according to a curve which is in symmetric relation to the curves nc, nb with respect to the vertical line at the dot percentage of 50%. In the dot percentage range from 50% to 100%, the curve is analyzed from 100% toward 50%, and the number of new dots of white pixels (2×2 white pixels) is considered rather than the number Dn of new dots of blackened pixels.

A process of determining thresholds th alternately successively in ascending and descending orders in the highlight area HL and the shadow area SD in step S4 will be described below with reference to a flowchart shown in FIG. 6. For the sake of brevity, the process of successively determining thresholds th in the highlight area HL will mainly be described below. In the shadow area SD, the same process of successively determining thresholds th is carried out.

In step S11, the initial values of thresholds th_hl (0 through (thmax−1)/2) in the highlight area (0% through 50%) and thresholds th_sd {thmax through (thmax−1)/2} in the shadow area (100% through 50%) are determined to be th_hl=0, th_sd=thmax, respectively.

Figure 6:
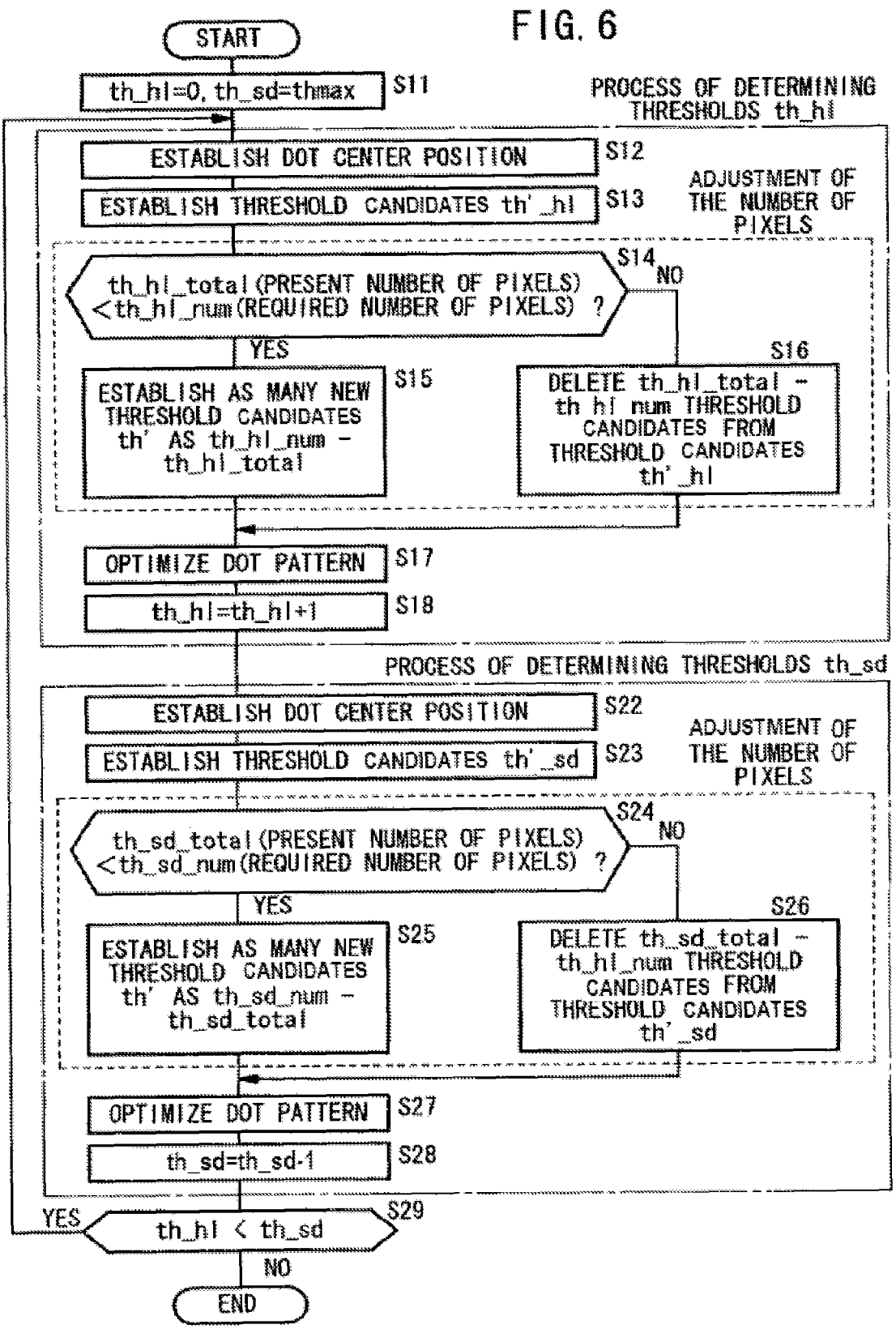
FIG. 6 is a flowchart of a detailed sequence of a threshold position determining process in step S4 of the overall sequence shown in FIG. 2.

In the flowchart shown in FIG. 6, positions (array) for placing all thresholds th up to the dot percentage of 50% are determined in the order of threshold 0→threshold thmax→threshold 1→threshold thmax−1→ ... →threshold (thmax−1)/2.

For determining an array (placement positions) of thresholds th_hl in the highlight area, dot center positions are established in step S12. In step S12, dot center positions of the number Dn of new dots determined in step S3 for the dot percentages, among the dot candidate positions in the highlight area HL of the blackened portion (region) of the binary data A2_bin (see FIG. 3D) determined in step S2, are established.

As described in Japanese Laid-Open Patent Publication No. 8-265566, the dot center positions are determined such that the dots established (assigned) by the thresholds th_hl whose placement positions are to be determined in the present threshold matrix TM are established in positions most spaced from the presently existing dots determined by the thresholds th_hl−1 for the preceding gradation where the placement positions of the thresholds th in the threshold matrix TM have already been determined.

For an easier understanding, the process will be described with reference to FIG. 7 which shows a super-threshold matrix STM made up of nine threshold matrixes TM1 through TM9 each having 25 thresholds. When positions for placing thresholds are determined in an ascending order from the highlight areas HL of the threshold matrixes TM or in a descending order from the shadow areas SD thereof, central positions of newly placed thresholds th_hl are determined such that the already determined positions for placing thresholds th ("1" in FIG. 7) and the positions for newly placing thresholds th_hl ("2" in FIG. 7) are most spaced from each other in the threshold matrixes TM including a central threshold matrix (a 5×5 threshold matrix in FIG. 7) TM5 and other threshold matrixes TM1 through TM4, TM6 through TM9 of the same threshold layout which are disposed around the central threshold matrix TM5 as nine nearby threshold matrixes in FIG. 7.

Figure 7:
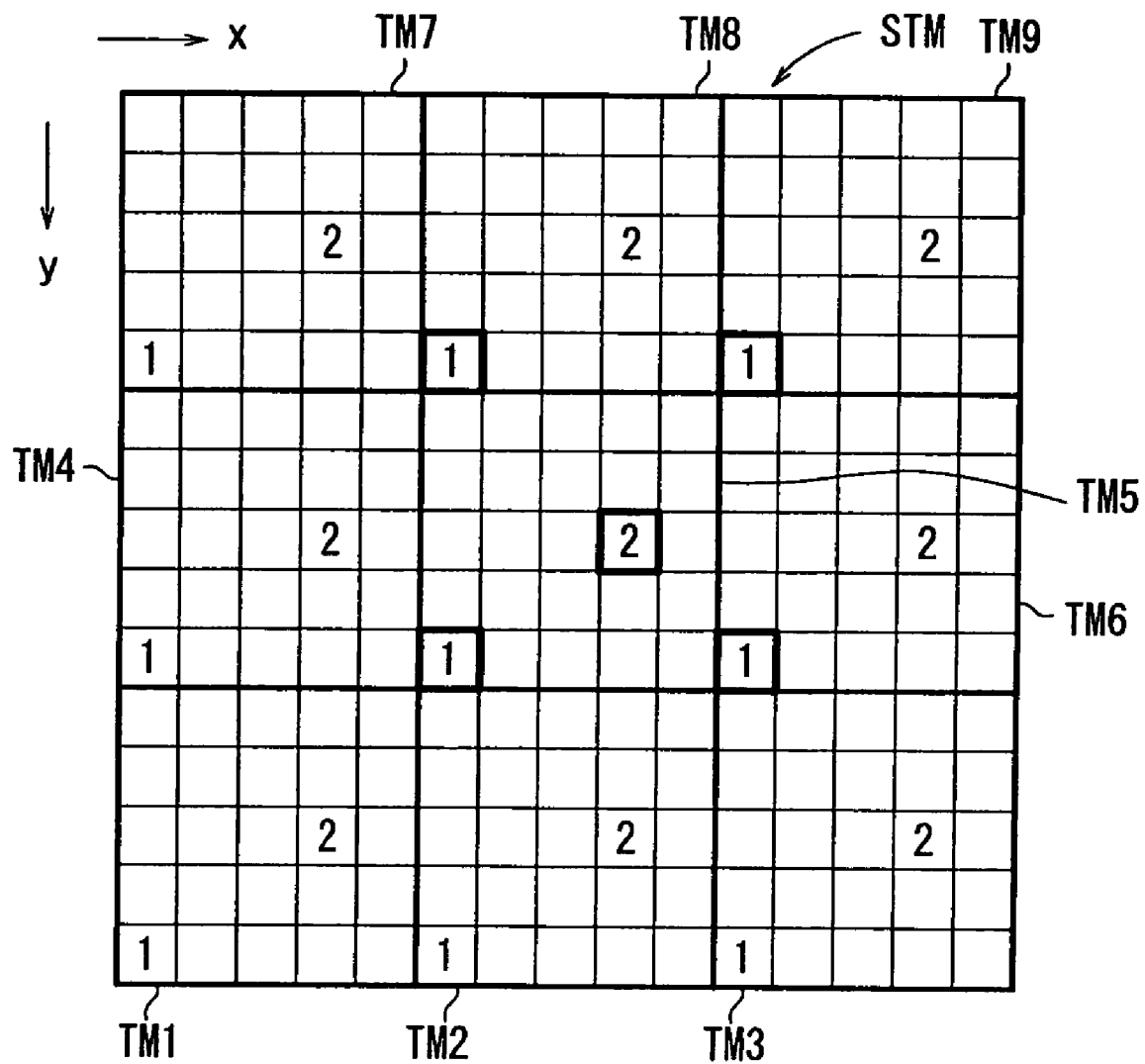
FIG. 7 is a diagram illustrative of a process of determining a threshold position for a next gradation.

In the example shown in FIG. 7, the central threshold "2" in a thick-line frame which is disposed within the threshold matrix TM5 is placed in either a position which contains a point contacted by four circles around respective four thresholds "1" in thick-line frames positioned around the central threshold "2" or a position which is closet to the above position and represents a blackened portion of the binary data A2_bin (see FIG. 3D).

Figure 8A:
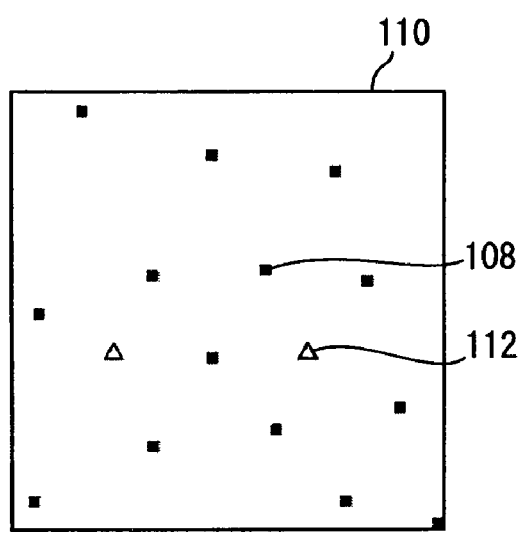
FIG. 8A is a diagram showing threshold candidate positions.

Specifically, as shown in FIG. 8A, positions 112 marked with Δ, for example, in a dot pattern 110 which is made up of dots 108 based on the thresholds th determined up to present are determined as central positions for placing dots.

Then, in step S13, candidates (threshold candidates) th'_hl for positions for placing thresholds are established. In this case, 2×2 (n=4)-pixel dots of a minimum size determined in step S1 around the central positions for placing dots which are determined in step S12 are established (placed), and used as candidates for placing new thresholds, i.e., threshold candidates th'_hl.

Figure 8B:
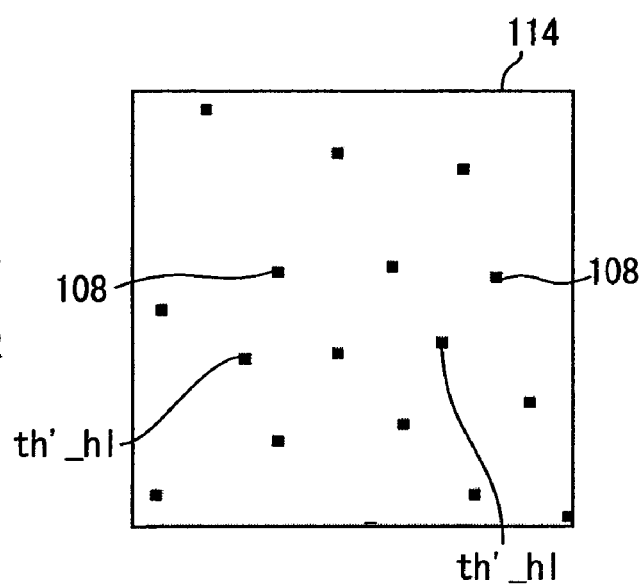
FIG. 8B is a diagram showing smallest-size dots placed in the threshold candidate positions.

Specifically, as shown in FIG. 8B, the threshold candidates th'_hl for the 2×2 (n=4)-pixel dots are set in the dot placing positions 112 marked with Δ in FIG. 8A, thus producing a dot pattern 114.

Then, in steps S14 through S16, it is determined whether the total number of pixels of a dot pattern generated by the threshold matrixes TM where the layout of the thresholds th is determined up to present, corresponds to the present dot percentage or not, thereby correcting the total number of pixels. The dot pattern is generated as follows: The image data generator 12 generates continuous-tone image data (image data I for generating a screen tint) of a gray pattern (whose pixel values are the same) corresponding to the dot percentage. The comparator 16 compares the generated continuous-tone image data with the threshold matrixes TM stored in the threshold matrix storage unit 14 and including thresholds up to the threshold th-1 which have been determined up to present. Binary data H produced from the comparator 16 are supplied to the dot pattern generator 18, which produces dot pattern data Ha. A dot pattern based on the dot pattern data Ha is displayed on the display unit 20*b* or the like.

In step S14, it is determined whether a present pixel count th_hl_total which is the sum of the total number of pixels based on the thresholds 0 through th-1 whose placement positions have already been determined and the total number of pixels based on newly established threshold candidates th'_hl, is smaller than a required pixel count th_hl_num=N× N×th/thmax required at the present dot percentage or not (th_hl_total<th_hl_num).

If the present pixel count th_hl_total is smaller than the required pixel count th_hl_num, then since it is necessary to add as many pixels as the difference (th_hl_num−th_hl-total) which is produced by subtracting the present pixel count th_hl_total from the required pixel count th_hl_num, new threshold candidates th' are established as dots for adding those pixels from the dots that are not based on the existing thresholds 0 through th-1 or the dots that are not based on the newly established threshold candidates th'_hl whose placement positions have not yet been determined in step S15.

If the present pixel count th_hl_total is greater than the required pixel count th_hl_num, then since it is necessary to delete as many pixels as the difference (the present pixel count th_hl_total−the required pixel count th_hl_num), dots for deleting those pixels are selected and deleted from the dots based on the newly established threshold candidates th'_hl in step S16.

In step S16, of the dots making up the dot pattern, a few dots may possibly be smaller than dots of a minimum size. In the present embodiment, because the dots of a minimum size are 2×2-pixel dots, the total number of pixels of the dot pattern which is made up of the dots of a minimum size is a multiple of 4. If the total number of dots is adjusted in order to equalize dot percentages, 3-pixel dots, 2-pixel dots, or 1-pixel dots, which are produced by deleting one; two, or three pixels from each of 2×2-pixel dots, may be necessary.

In step S15, as disclosed in Japanese Laid-Open Patent Publication No. 2001-292317, a dot pattern (binary image data) in the spatial domain, which is made up of the dots based on the thresholds 0 through th−1 whose placement positions have already been determined and the dots based on the newly established threshold candidates th'_hl is FFTed into a dot pattern in the frequency domain by the FFT unit 32, after which high frequencies in the dot pattern are cut off by an LPF (Low-Pass Filter) 40. Then, the dot pattern is IFFTed back into a dot pattern in the spatial domain by the IFFT unit 36, after which low-frequency components are extracted from the dot pattern. Positions where the extracted low-frequency components are weakest are set to threshold candidates th' to be added. However, if a dot pattern having a dot percentage of 50% is established in step S2, then positions where the low-frequency components are weakest within blackened pixels of the dot pattern having the dot percentage of 50% may be set to threshold candidates th' to be added.

A process of extracting positions where low-frequency components are weakest will be described below in greater detail. When a dot pattern is FFTed into a dot pattern in the frequency domain, since frequency components present in the repetitive frequency of the threshold matrix TM are noise components (low-frequency components), the dot pattern is filtered by the LPF 40 to extract the low-frequency components.

Since the noise components are perceived by the human being, the low-frequency components are extracted by a human visual characteristic filter 42, used as the LPF 40, which has a sensitivity level of 0 at a spatial frequency of 0 c/mm, a maximum sensitivity level of 1 in the vicinity of a spatial frequency of 0.8 c/mm, a sensitivity level of about 0.4 at a spatial frequency of 2 c/mm, and a sensitivity level of about 0 at a spatial frequency in the range from 6 to 8 c/mm. A model of human visual frequency characteristics is described in detail in "Design of minimum visual modulation halftone patterns" written by J. Sullivan, L. Ray, and R. Miller, IEEE Trans. Syst. Man Cybern., vol. 21, No. 1, 33-38 (1991).

Then, the low-frequency components extracted by the LPF 40 are IFFTed into low-frequency components in the spatial domain by the IFFT unit 36. Because the produced low-frequency components have intensity variations, an image made up of these low-frequency components and the positions of the threshold candidates th' in the threshold matrix TM are compared with each other, and positions where the low-frequency components are weakest (the values are smallest) are set to threshold candidates th'_hl.

In the shadow area SD, positions where the low-frequency components are strongest (the values are greatest) may be set to threshold candidates th'_sd.

In step S16, low-frequency components may similarly be extracted, and pixels may be deleted from dots in positions where the low-frequency components are strongest (the values are greatest), of the new threshold candidates th'_hl. In the shadow area SD, pixels may be deleted from dots based on the new thresholds th'_sd in positions where the low-frequency components are weakest (the values are smallest).

Figure 9B:
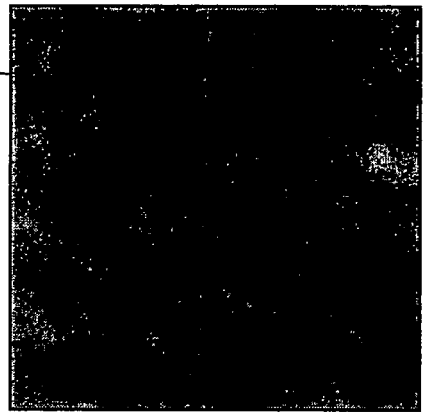
FIG. 9B is a diagram showing a pattern with stressed dark and light areas which is produced by processing the dot pattern shown in FIG. 9A with a visual characteristic filter.
Figure 9D:
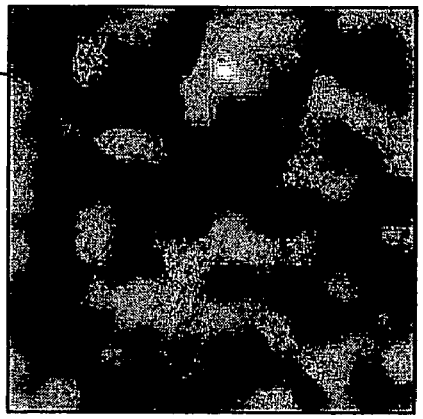
FIG. 9D is a diagram showing a pattern with stressed dark and light areas which is produced by processing the dot pattern shown in FIG. 9C with a visual characteristic filter.
Figure 9A:
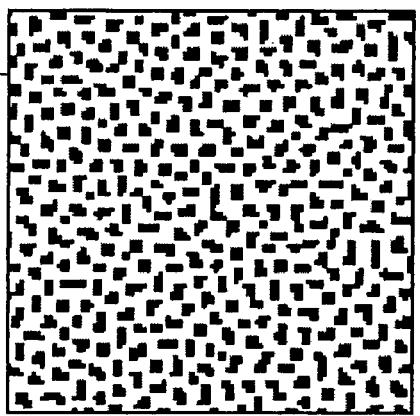
FIG. 9A is a diagram showing a dot pattern having 2×2-pixel dots of a minimum size and a dot percentage of 30%.
Figure 9C:
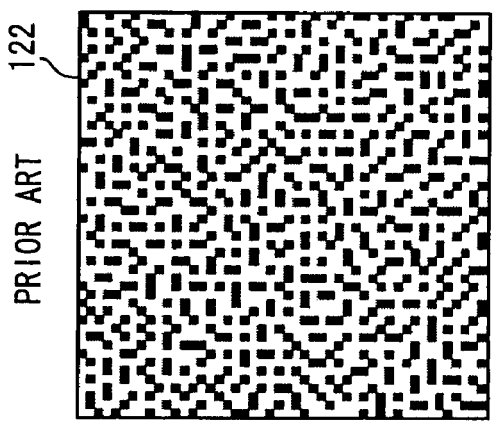
FIG. 9C is a diagram showing a dot pattern of a conventional 2×2-pixel dot FM screen.

FIG. 9A shows a dot pattern 120 having a dot percentage of 30% where the dots of a minimum size are 2×2-pixel dots, according to the present embodiment, the dot pattern 120 being generated by the above process. FIG. 9C shows a dot pattern 122 of the conventional 2×2-pixel dot FM screen.

Figure 10B:
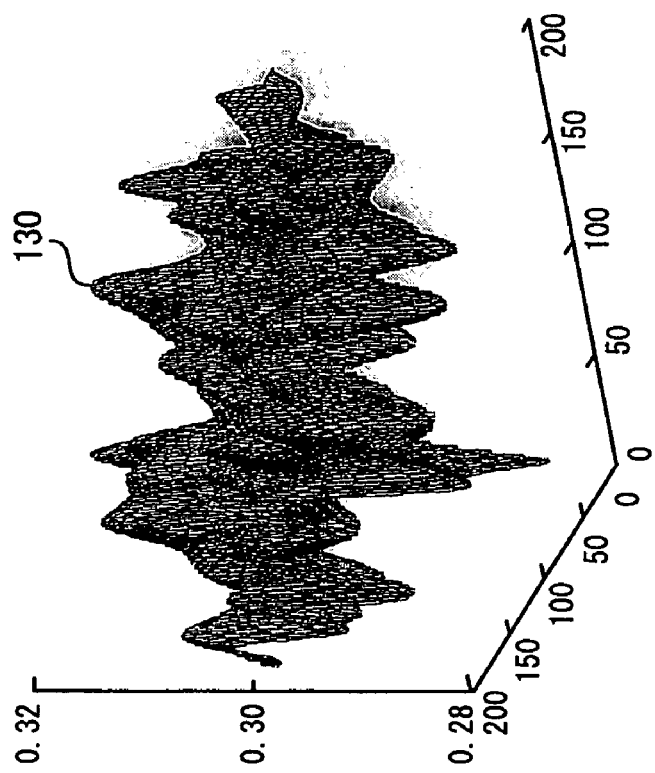
FIG. 10B is a perspective view of the pattern of dark and light areas shown in FIG. 9D.
Figure 10A:
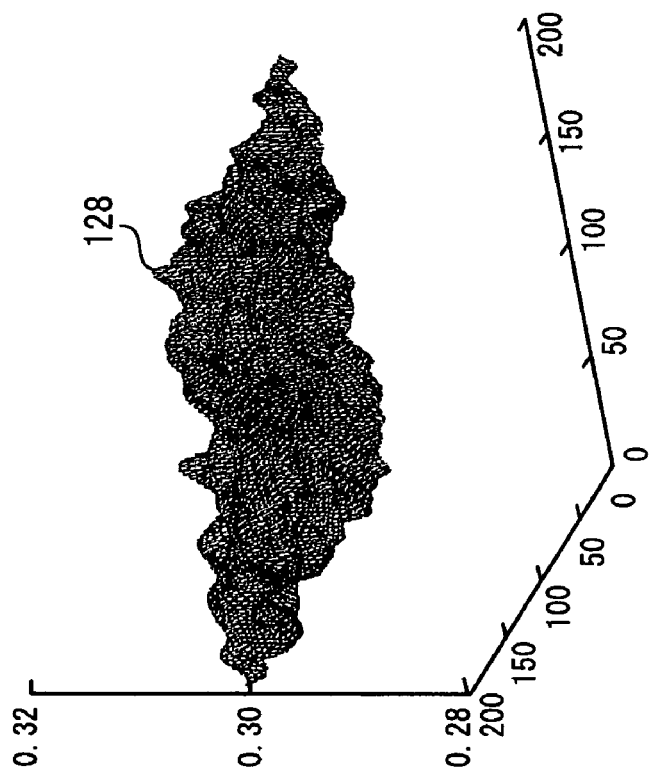
FIG. 10A is a perspective view of the pattern of dark and light areas shown in FIG. 9B.

FIGS. 9B and 9D show dot patterns 124, 126, respectively, with dark and light areas which are produced by processing the dot patterns 120, 122 with the visual characteristic filter 42 used as the LPF 40. FIGS. 10A and 10B show in perspective respective patterns 128, 130 which represent the dot patterns 124, 126 with dark and light areas. In FIGS. 10A and 10B, the vertical axis represents dot percentages with white at 0, black at 1.0, and the dot percentage of 30% at 0.30, and the horizontal axes represent pixels. It can be seen that the dot pattern 120 shown in FIG. 9A according to the present embodiment has smaller intensity variations in the dark and light areas and hence smaller amplitudes than the conventional dot pattern 122 shown in FIG. 9C.

In step S15 or S16, as disclosed in Japanese Laid-Open Patent Publication No. 2002-368995, when the dot pattern is IFFTed by the IFFT unit 36 to produce the low-frequency components in the spatial domain, the low-frequency components may further be FFTed by the FFT unit 32, and particular frequency components may be extracted in a descending intensity order by a particular frequency component extractor 44. The extracted particular frequency components may be IFFTed in a descending intensity order to produce images in the spatial domain, and positions where intensity components are weakest, of the positions which do not intensify these images, may be set to threshold candidates th' or threshold candidates th'_hl.

According to the above processing in steps S12 through S16, a predetermined number of thresholds th may be established on the threshold matrix TM corresponding to positions where dots are newly assigned on the dot pattern.

In step S17, the dot pattern generated by the determined thresholds th is optimized. This process of optimizing the dot pattern is not required if a high-quality dot pattern has been generated by the processing up to step S16.

The process of optimizing the dot pattern may be either one or both of the method disclosed in Japanese Patent No. 3400316 and the process disclosed in Japanese Laid-Open Patent Publication No. 2002-369005.

Specifically, according to the method disclosed in Japanese Patent No. 3400316, low-frequency components are extracted from the dot pattern generated by the thresholds th_hl. Of the extracted low-frequency components, pixels that are placed in positions where the intensity is strongest and pixels that are placed in positions where the intensity is weakest are switched around such that the former pixels will be white pixels and the latter pixels will be blackened pixels, thereby reducing the intensities of the low-frequency components. The blackened pixels have to be pixels attached to the periphery of dots, i.e., pixels held in contact with the periphery of dots, and the threshold th of the blackened pixels is of value equal to the threshold th of the dots.

According to the process disclosed in Japanese Laid-Open Patent Publication No. 2002-369005, as with the process disclosed in Japanese Laid-Open Patent Publication No. 2002-368995, the dot pattern generated by the thresholds th is FFTed, thereafter filtered by the visual characteristic filter 42 and the LPF 40, and then IFFTed into low-frequency components in the spatial domain. The low-frequency components are FFTed to extract frequency components in a descending intensity order. The extracted particular frequency components are IFFTed in a descending intensity order to produce images in the spatial domain, and pixels in positions where intensity components are weakest, of the positions which do not intensify these images and pixels that are placed in positions where the intensity is weakest are extracted and switched around, thereby reducing the intensities of the low-frequency components. The extracted pixels have to be pixels attached to the periphery of dots, and the threshold th of the blackened pixels is of value equal to the threshold th of the dots.

In the process of extracting low-frequency components in steps S14 through S17, as disclosed in Japanese Laid-Open Patent Publication No. 2002-369005, a density image corresponding to a dot pattern output from an image output apparatus may be simulated, i.e., predicted, by a density image simulator (predictor) 46, and low-frequency components may be extracted from the density image. In this case, a test pattern is actually output from the output system 22, and the density image simulator 46 measures how one dot of the original dot pattern is output on the test pattern with dark and light areas, thereby calculating the dot percentage of a density image close to an actual density image from the dot pattern.

An amount of exposure from the shape of the laser beam used in the output system 22 is integrally calculated, and a density image is predicted from the gamma characteristics of the photosensitive material on the printing plate materials EM.

The prediction of a density image based on calculations will be described in detail below. A simulation shape for computer calculations of a laser beam for forming 1×1-pixel dots, 2×2-pixel dots, ... on a recording medium such as a film F or the like is determined. The laser beam has a shape close to the Gaussian distribution which can substantially be expressed using a beam diameter that is determined by the maximum value $1/e^2$ of the amplitude. The amount of exposure for each dot is calculated from the laser beam and the dot pattern.

Then, the amounts of exposure for the respective dots, i.e., 1×1-pixel dots, 2×2-pixel dots, ... are converted into densities of the dots using the exposure characteristics, i.e., the gamma characteristics, of the photosensitive material such as a film or the like. A density image (density-simulated image) is obtained from the densities of the dots thus determined. Low-frequency components can be extracted from the density image according to the above process using FFT. Actually, low-frequency components that are extracted from a density image can often be more effective to remove noise components, rather than low-frequency components extracted from a dot pattern.

In this manner, the positions of thresholds th_hl in the threshold matrix are determined.

Then, in step S18, the newly established thresholds th_hl are set to thresholds th_hl+1 for the next gradation (th_hl=th_hl+1).

Similarly, thresholds th_sd for the shadow area SD are determined in steps S22 through S28.

In step S29, the thresholds th_hl determined from the highlight area HL and the thresholds th_sd determined from the shadow area SD are compared with each other for magnitude, and thresholds th_hl and thresholds th_sd are determined until they are of the same value, i.e., until the dot percentage of 50% is achieved. When thresholds th_hl and thresholds th_sd are of the same value, the generation of the threshold matrix is finished.

FIGS. 11A through 11F show dot patterns 131 through 135, 137, respectively, which are part of dot patterns having dot percentages of 10%, 20%, 30%, 40%, 50%, and 70% that are finally generated by dot pattern generator 18 by comparing the thus generated threshold matrix TM with continuous-tone image data of gray patterns having corresponding dot percentages with the comparator 16.

The dot pattern 137 having the dot percentage of 70% may be a pattern that is generated by reversing the white and black areas of the dot pattern 133 having the dot percentage of 30%, or an independently generated pattern.

The dot patterns 131 through 135, 137 shown in FIGS. 11A through 11F are generated by selecting the dot-and-dash-line curve nb which represents the accumulated value of the number of new dots in FIG. 4. The dot pattern 131 having the dot percentage of 10% is made up of only 2×2-pixel dots of a minimum size. The dot pattern 132 having the dot percentage of 20% include a reduced proportion of 2×2-pixel dots of a minimum size and pixels (including 4- through 12-pixel dots) corresponding to the dot percentage that are attached to the periphery of the existing dots (2×2-pixel dots). In dot percentages from 25% to 30%, dots of a minimum size are not newly assigned, but pixels are attached to the existing dots, thereby increasing the blackened ratio. In dot percentages of 35% and higher, more dots of a minimum size are newly assigned. Since the newly assigned dots serve to forcibly join adjacent dots, the junctions between the dots can be distributed. With the above settings, it is possible to generate a threshold matrix TM capable of generating a dot pattern for smoothly reproducing gradations.

According to the above embodiment, as described above, dots of a minimum size, each made up of a certain number of pixels (one or more pixels), are determined for a highlight area, and a pattern frequency r in the intermediate tone of a dot pattern is determined (step S1). Based on the pattern frequency r, candidate positions for the dots are determined (step S2). Then, the number Dc of new dots of a minimum size is established at each dot percentage (step S3). Under the limitations of the number Dc of new dots of a minimum size and the pattern frequency r in the intermediate tone, thresholds th for generating optimum dot patterns at respective dot percentages are successively generated (step S4). In this manner, a threshold matrix TM optimum for the output system 22 can be generated. The threshold matrix TM optimum for the output system 22 means a threshold matrix TM which is capable of generating an image where dots are reliably and solidly assigned to a highlight area, and graininess is reduced and a dot gain is small in an intermediate tone area, for example.

In the above embodiment, when the output system 22 has an output resolution R pixels/mm and when dot pattern data Ha generated from continuous-tone image data I whose pixel values correspond to a dot percentage P of 50% as binary data H have a pattern frequency r c/mm, a threshold matrix TM having a matrix size of N×M pixels (including the case where N=M) for converting a continuous-tone image into a dot pattern representing a binary image has a certain threshold array. The threshold array makes it possible to generate dot pattern data Ha where dots of a minimum size which are made up of n pixels (n is at least 1) are placed out of contact with each other when the dot percentage P increases from 0% to a certain dot percentage where the number of dots becomes nearly $N \times M/(R/r)^2$. Also, the threshold array makes it possible to generate dot pattern data Ha where pixels are attached to the periphery of the existing dots of a minimum size and the number of dots is not increased after the dot percentage P is more than the certain dot percentage where the number of the dots becomes nearly $N \times M/(R/r)^2$.

In the dot percentages P after the number of dots becomes nearly $N \times M/(R/r)^2$, the threshold matrix TM has the dot areas adjusted by attaching pixels to the periphery of the existing dots of a minimum size.

One method of generating a threshold matrix according to the present invention is described above. The method can be applied to a method for generating a threshold matrix for generating a general FM screen or a general stochastic screen. A method of assigning a generated threshold matrix is described below.

In the above description, only one printing plate (or color separation) has been described. For reproducing color images, however, as well as a 4-color printing process including separated C, M, Y, K colors, it is customary to employ a 7-color printing process including separated C, M, Y, K colors and R, G, B colors, or a 6-color printing process including C, M, Y, K colors, G color, and orange color. Though different threshold matrixes having J threshold matrix sizes may be generated with respect to J (J≧5) colors, any interference between complementary colors is small as dot percentages for complementary colors are hardly increased. Therefore, a threshold matrix for a color may also be used for its complementary color. For example, when inks of C, M, Y, K colors and R, G, B colors are used, one threshold matrix may be used for M and G printing plates, one threshold matrix for C and R printing plates, and one threshold matrix for Y and B printing plates. Similarly, when inks of C, M, Y, K colors, G color, and orange color are used, one threshold matrix may be used for M and G printing plates, and one threshold matrix for-C and orange printing plates.

Further, J threshold matrixes having the same size but different threshold arrays may be generated.

At the same time, however, generating threshold matrixes for J (J≧5) color separations requires a heavy workload. Also, it is difficult to handle J color separations in a RIP (Raster Image Processor) system generally using four threshold matrixes for four C, M, Y and K colors. Thus, hereinafter, a simple method of generating and assigning threshold matrixes will be described, in view of Munsell Hue Circle.

The term "(printing) plate", or "film" will be used in the description. However, the present invention is not limited to an apparatus, a system, a method, or the like using physical plates or films for reproducing color images. The present invention can be applied to every apparatus, system, method, or the like that reproduces color images by using color separations such as dot pattern data for colors.

Figure 12A:
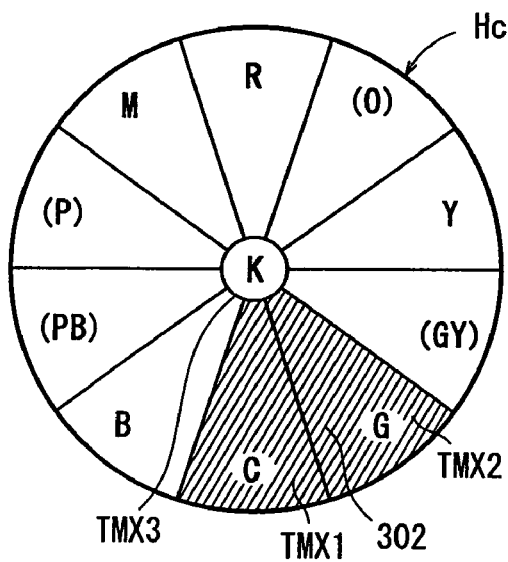
FIG. 12A is a diagram of a hue circle for assigning threshold matrixes to color separations for C, K and G in a 7-color printing process using color separations for C, M, Y, K, R, G and B.
Figure 12B:
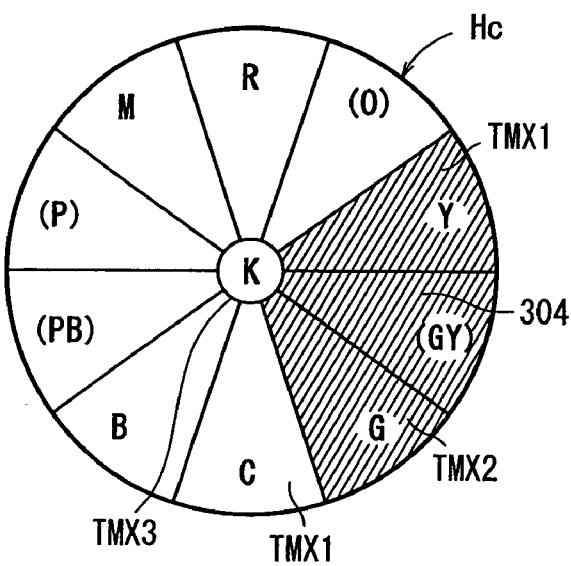
FIG. 12B is a diagram of the hue circle for assigning threshold matrixes to color separations for C, Y, K and G in the 7-color printing process using the color separations for C, M, Y, K, R, G and B.
Figure 12C:
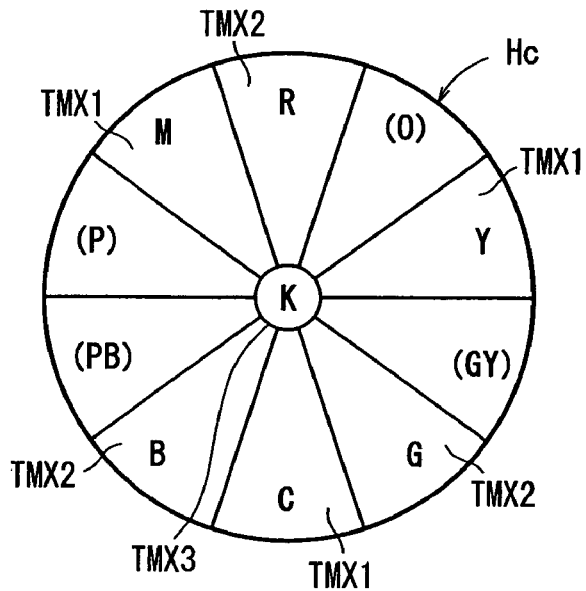
FIG. 12C is a diagram of the hue circle for assigning threshold matrixes in the 7-color printing process using the color separations for C, M, Y, K, R, G and B.

First Assigning Method (Assignment mainly considering adjacent hues in a hue circle):

For example, a 7-color printing process using printing plates (or plates) for C, M, Y, K, R, G and B is considered. FIGS. 12A, 12B and 12C show a hue circle HC.

As shown in FIGS. 12A through 12C, the hue circle HC comprises five principle hues (or colors) R (Red), Y (Yellow), G (Green), B (Blue) and P (Purple), which are arranged in a circle (hue circle) so that the circle is equally divided into five. Then, other hues YR (Yellow Red or Orange), GY (Green Yellow), BG (Blue Green or Cyan), PB (Purple Blue) and RP (Red Purple or Magenta) are arranged between those five principle hues.

In FIG. 12A, for example, a color component of a hatched and substantially fan-shaped area 302 is defined by boundaries of the color C, the color G color and the color K. The color component of the area 302 can be produced by using a C-plate, a G-plate and a K-plate. It is necessary to assign different threshold matrixes to the C-plate, the G-plate and the K-plate for avoiding shortcomings due to slight displacement between superimposed dots. Now, the threshold matrixes each having a different threshold array for the C-plate, the G-plate and the K-plate are referred to as TMX1, TMX2 and TMX3, and indicated as follows.

$$(C, G, K) = (TMX1, TMX2, TMX3)$$

Next, as shown in FIG. 12B, a color component of a hatched and substantially fan-shaped area 304 is defined by boundaries of the color Y, the color G and the color K. The area 304 is on the right side of the area 302. Also, it is necessary to assign different threshold matrixes to the G-plate, the Y-plate and the K-plate. In this case, the threshold matrixes TMX2 and TMX3 have already been assigned to the G-plate and the K-plate, respectively. Thus, the threshold matrix TMX1, which is different from the threshold matrixes TMX2 and TMX3 assigned to the G-plate and the K-plate but same as the threshold matrix TMX1 assigned to the C-plate, can be assigned to the Y-plate. The assigning is indicated as follows.

$$(Y, G, K) = (TMX1, TMX2, TMX3)$$

In the same way, threshold matrixes for C, M, Y, K, R, G and B can be assigned as indicated below by using the three threshold matrixes TMX1, TMX2 and TMX3 (see FIG. 12C).

(C, M, Y, K, R, G, B)=(TMX1, TMX1, TMX1, TMX3, TMX2,TMX2, TMX2)

According to the first assigning method of a threshold matrix to printing plates (or films), each of the threshold matrixes converting continuous-tone image data into dot pattern image data, the continuous-tone image data comprising at least data for J colors (J≧5) including C, M, Y and K, the dot pattern image data comprising data for J plates in which screen ruling or screen angle is not defined, a threshold matrix TMX3 with a first threshold array is assigned to a K-plate (a threshold matrix for a K-plate); a threshold matrix TMX1 with a second threshold array is assigned to, e.g., a C-plate that is one of the J plates other than the K-plate; and a threshold matrix TMX2 with a third threshold array is assigned to a G-plate and a B-plate, G and B are adjacent to C in a hue circle, the number of the threshold matrixes assigned to the J plates is made as small as possible.

Thus, the three different threshold matrixes TMX3, TMX1 and TMX2 are assigned to a plate for K-color, a plate for another color other than K, and a plate for a color adjacent to the other color in the hue circle HC, respectively. In the hue circle HC, generally, a color component of a substantially fan-shaped area defined by boundaries of K-color, a color other than K, and another color adjacent to the other color can be reproduced by mixing these three colors. When threshold matrixes having different threshold arrays are used for these three colors to be mixed, excessive overlapping of dots are avoided and shortcomings due to superimposition of images can be prevented.

In assigning threshold matrixes, if the number of the threshold matrixes is made as small as possible on condition that the threshold matrixes for adjacent colors are not the same as each other, workload of generating the threshold matrixes can be reduced.

In this case, for example, the J plates are made up of a C-plate, an M-plate, a Y-plate, a K-plate, an R-plate, a G-plate and a B-plate. In the hue circle, C is adjacent to G, G is adjacent to Y, Y is adjacent to R, R is adjacent to M, M is adjacent to B, and B is adjacent to C, other than K, as shown in FIG. 12C (i.e., colors (O), (GY), (PB) and (P) in FIG. 12C are not considered in this example). Thus, the threshold matrix TMX1 is assigned to one of the C-plate, Y-plate and the M-plate. In the hue circle, C is not adjacent to Y, Y is not adjacent to M, and M is not adjacent to C. Now, the threshold matrix TMX2 is assigned to the G-plate, the R-plate and the B-plate. In the hue circle, G is not adjacent to R, R is not adjacent to B, and B is not adjacent to G. Accordingly, for the plates for the colors of C, M, Y, K, R, G and B, only three threshold matrixes TMX1, TMX2, TMX3 each having a different threshold array are sufficient. Since the total number of the threshold matrixes is smaller than the number of the plates, workload of generating the threshold matrixes can be reduced.

Further, each of the threshold matrixes TMXc, TMXm, TMXy and TMXk each having a different threshold array for plates for colors C, M, Y and K converts continuous-tone image data input with a tone value m comprising at least data for J colors (J≧5) into v-valued dot pattern image data comprising data for J plates in which screen ruling or screen angle is not defined. One color other than C, M, Y or K is chosen, and one of the threshold matrixes TMXc, TMXm and TMXy for the C-plate, the M-plate and the Y-plate is assigned to a plate for the color. In this case, the threshold matrix for one of C, M and Y that is not adjacent to the color in the hue circle is chosen. That is, the threshold matrix assigned to the plate for the color other than C, M, Y or K is different from the threshold matrix for C, M or Y that is adjacent to the color in the hue circle. Accordingly, the number of the threshold matrixes for multi-color plates for reproducing a color image with five or more plates may generally be four, i.e., the threshold matrixes TMXc, TMXm, TMXy and TMXk for the C-plate, the M-plate, the Y-plate and the K-plate. Thus, the threshold matrixes that do not cause shortcomings in superimposing images can be generated and assigned with a light workload.

Second Assigning Method (Assignment of threshold matrixes having the same threshold array to plates for hues that are complementary to each other in a hue circle):

For example, a 7-color printing process using plates for C, M, Y, K, R, G and B is considered. With reference to the hue circle HC shown in FIG. 13, for smooth reproduction of a color gradation of hues in the vicinity of G, in practice, it is preferable to mix C and Y. Thus, it is much preferable to assign different threshold matrixes to the C-plate and the Y-plate, though the same threshold matrix TMX1 is assigned to the C-plate and Y-plate in the first assigning method. In other words, it is preferable to assign different threshold matrixes TMX having different threshold arrays to C-plate and Y-plate.

In this case, for reproducing four colors C, M, Y and K, generally, threshold matrixes TMXc, TMXm, TMXy and TMXk having different threshold arrays are prepared. Thus, these threshold matrixes TMXc, TMXm, TMXy and TMXk can be assigned to for the C-plate, the M-plate, the Y-plate and the K-plate, respectively.

(C, M, Y, K)=(TMXc, TMXm, TMXy, TMXk)

Figure 13:
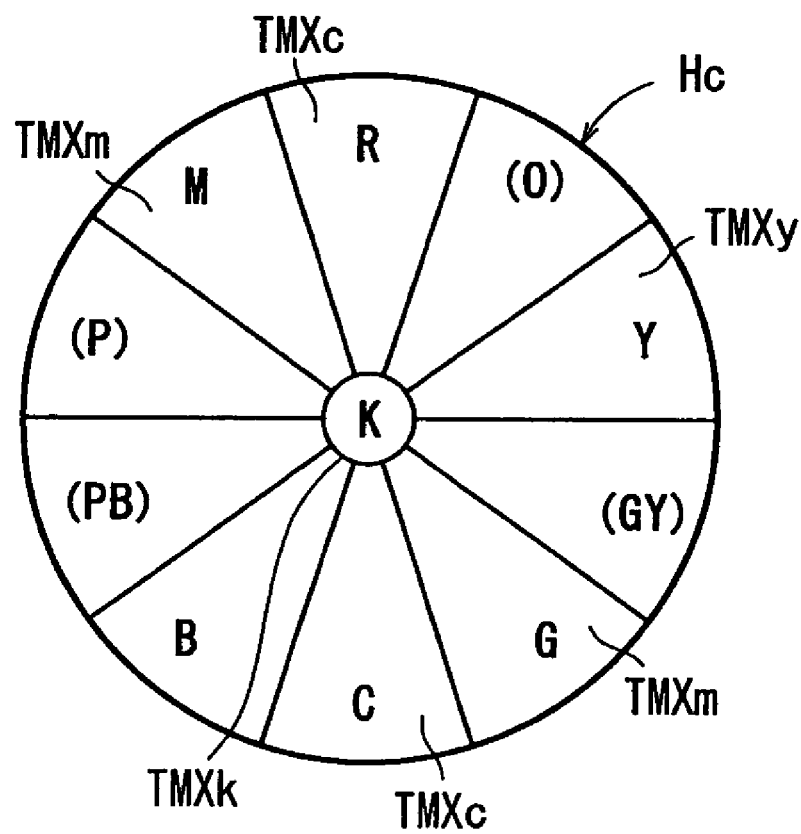
FIG. 13 is a diagram of the hue circle for assigning threshold matrixes for color separations for C, M, Y and K to color separations for C, M, Y, K, R, G and B in the 7-color printing process.

Now, with reference to the hue circle HC shown in FIG. 13, to the color G defined by the boundaries of the colors C, Y and K, it is necessary to assign a threshold matrix other than the threshold matrixes TMXc, TMXy and TMXk for the colors C, Y and,K. Thus, the threshold matrix TMXm for the M-plate can be used for the G-plate.

In this way, the threshold matrixes for the plates of C, M, Y and K colors can be assigned to each of the plates of C, M, Y, K, R, G and B colors as follows.

(C, M, Y, K, R, G, B)=(TMXc, TMXm, TMXy, TMXk, TMXc, TMXm, TMXy)

This assignment means that: the threshold matrix TMXc for the C-plate is assigned to the color R complementary to the color C; the threshold matrix TMXm for the M-plate is assigned to the color G complementary to the color M; and the threshold matrix TMXy for the Y-plate is assigned to the color B complementary to the color Y.

Figure 14:
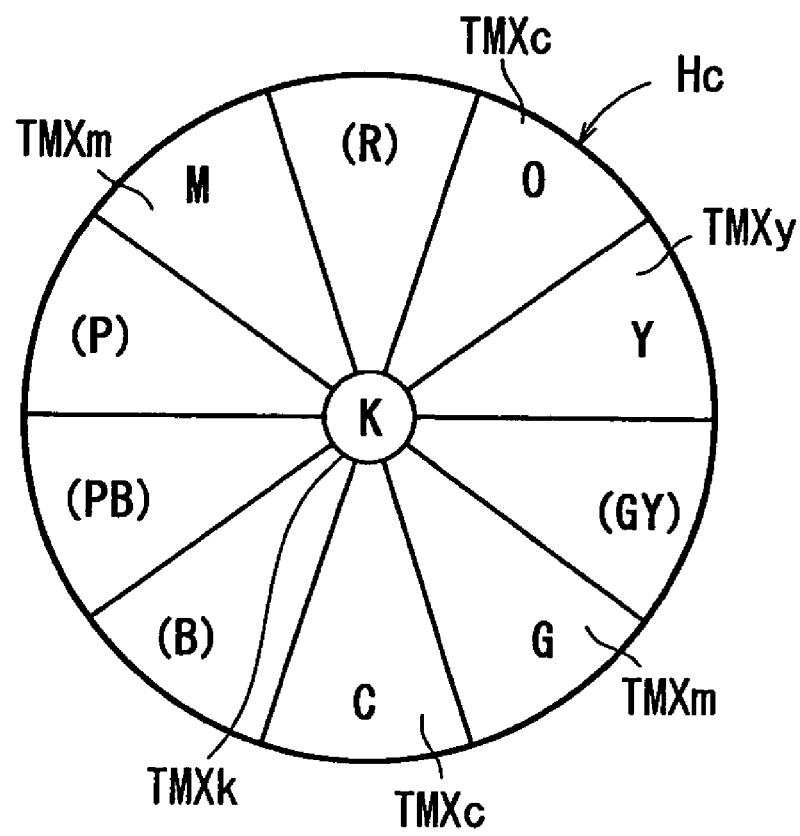
FIG. 14 is a diagram of the hue circle for assigning threshold matrixes for color separations for C, M, Y and K to color separations for C, M, Y, K, O and G in a 6-color printing process.

Next, a 6-color printing process using plates for C, M, Y, K, O and G is considered. With reference to the hue circle HC shown in FIG. 14, when the threshold matrixes TMXc, TMXm, TMXy and TMXk having different threshold arrays are assigned to for the C-plate, the M-plate, the Y-plate and the K-plate, respectively, it is understood that the threshold matrix TMXc for the C-plate is assigned to the color O substantially complementary to the color C and that the threshold matrix TMXm for the M-plate is assigned to the color G complementary to the color M. The color O is considered to be substantially complementary to the color C since it is far from the color C in the hue circle HC. Accordingly, the threshold matrixes for the plates of C, M, Y and K colors can be assigned to each of the plates of C, M, Y, K, O and G colors as follows.

(C, M, Y, K, O, G)=(TMXc, TMXm, TMXy, TMXk, TMXc,TMXm)

According to the second assigning method of a threshold matrix to printing plates (or films), each of the threshold matrixes TMXc, TMXm, TMXy and TMXk converting continuous-tone image data into dot pattern image data, the continuous-tone image data comprising at least data for J colors (J≧5) including C, M, Y and K, the dot pattern image data comprising data for J plates in which screen ruling or screen angle is not defined, a first threshold matrix TMXk with a first threshold array is assigned to a K-plate (a threshold array for a K-plate); and a second threshold matrix with a second threshold array is assigned to plates for colors other than K, the colors other than K are complementary to each other.

Even if threshold matrixes having the same threshold array are used for the hues that are complementary to each other, unstable color reproduction or unevenness or irregularity of hue or shade in the image due to less superimposition of dots by screen displacement does not occur. This is because the colors that are complementary to each other are seldom mixed. If the colors that are complementary to each other are mixed, the mixed color is merely gray. Further, workload of generating the threshold matrixes can be reduced since the total number of the threshold matrixes is smaller than the number of printing plates for respective colors.

In this case, for example, the J plates are made up of a C-plate, an M-plate, a Y-plate, a K-plate, an R-plate, a G-plate and a B-plate. Then, as shown in FIG. 13, a threshold matrix TMXc for the C-plate is assigned to the C-plate, a threshold matrix TMXm for the M-plate is assigned to the M-plate, a threshold matrix TMXy for the Y-plate is assigned to the Y-plate, and a threshold matrix TMXk for the K-plate is assigned to the K-plate. These four threshold matrixes TMXc, TMXm, TMXy and TMXk are different from each other. In the hue circle, C is adjacent to G, G is adjacent to Y, Y is adjacent to R, R is adjacent to M, M is adjacent to B, and B is adjacent to C. The threshold matrix TMXm for the M-plate is assigned to the G-plate, the threshold matrix TMXc for the C-plate is assigned to the R-plate, and the threshold matrix TMXy for the Y-plate is assigned to the B-plate, since G is complementary to M, R is complementary to C, and B is complementary to Y. Thus, for the plates for colors C, M, Y, K, R, G and B, the threshold matrixes TMXc, TMXm, TMXy and TMXk each having a different threshold array for colors C, M, Y and K can be used. The workload of generating the threshold matrixes can be reduced since the total number of the threshold matrixes is smaller than the number of printing plates for respective colors. In this way, it is possible to handle threshold matrixes for printing plates for C, M, Y, K, R, G and B colors in a RIP system etc. generally using four threshold matrixes for four C, M, Y, K colors.

Also, for example, the J plates are made up of a C-plate, an M-plate, a Y-plate, a K-plate, an O-plate and a G-plate. Then, a threshold matrix TMXc for the C-plate is assigned to the C-plate, a threshold matrix TMXm for the M-plate is assigned to the M-plate, a threshold matrix TMXy for the Y-plate is assigned to the Y-plate, and a threshold matrix TMXk for the K-plate is assigned to the K-plate. These four threshold matrixes TMXc, TMXm, TMXy and TMXk are different from each other. In the hue circle, C is adjacent to G, G is adjacent to Y, Y is adjacent to O, O is adjacent to M, and M is adjacent to C. The threshold matrix TMXm for the M-plate is assigned to the G-plate and the threshold matrix TMXc for the C-plate is assigned to the O-plate, since G is complementary to M, and O is complementary to C. Thus, for the plates for colors C, M, Y, K, O and G, the threshold matrixes TMXc, TMXm, TMXy and TMXk each having a different threshold array for colors C, M, Y and K can be used. Similarly, the workload of generating the threshold matrixes can be reduced since the total number of the threshold matrixes is smaller than the number of printing plates for respective colors. In this way, it is possible to handle threshold matrixes for printing plates for C, M, Y, K, O and G colors in a RIP system etc. generally using four threshold matrixes for four C, M, Y, K colors.

In the first and second assigning methods, one of the threshold matrixes is generated by changing a reading method of thresholds placed in the threshold array in other of the threshold matrixes. Thus, a threshold array in the threshold matrix can be changed, and time for generating a threshold matrix can be significantly reduced, compared with a threshold matrix generated from nothing.

Japanese Laid-Open Patent Publication No. 2004-64473 discloses that a reading method of a threshold matrix is changed for generating another threshold matrix.

Figure 15:
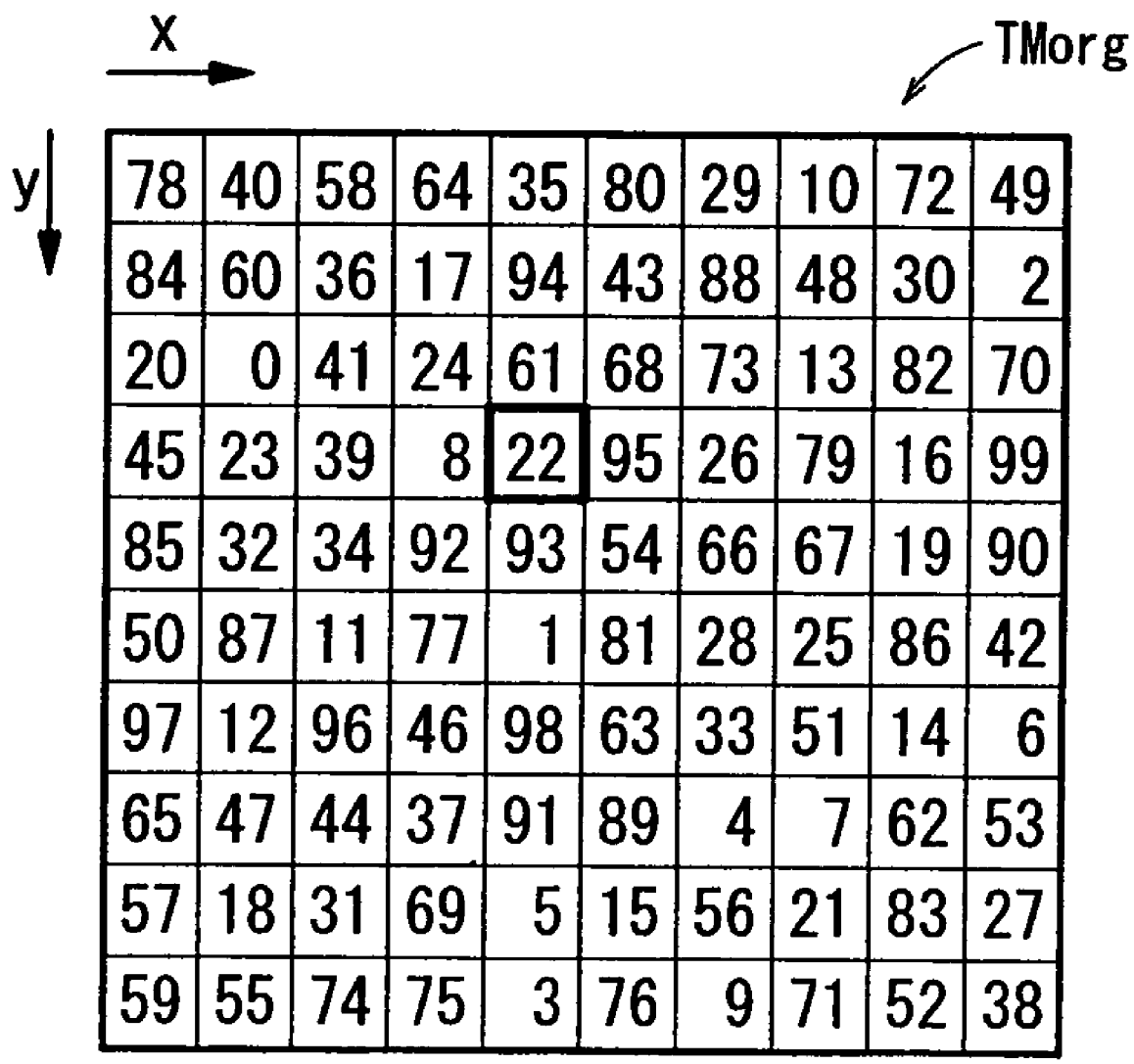
FIG. 15 is a diagram showing an original threshold matrix for a color separation for a certain color.
Figure 17:
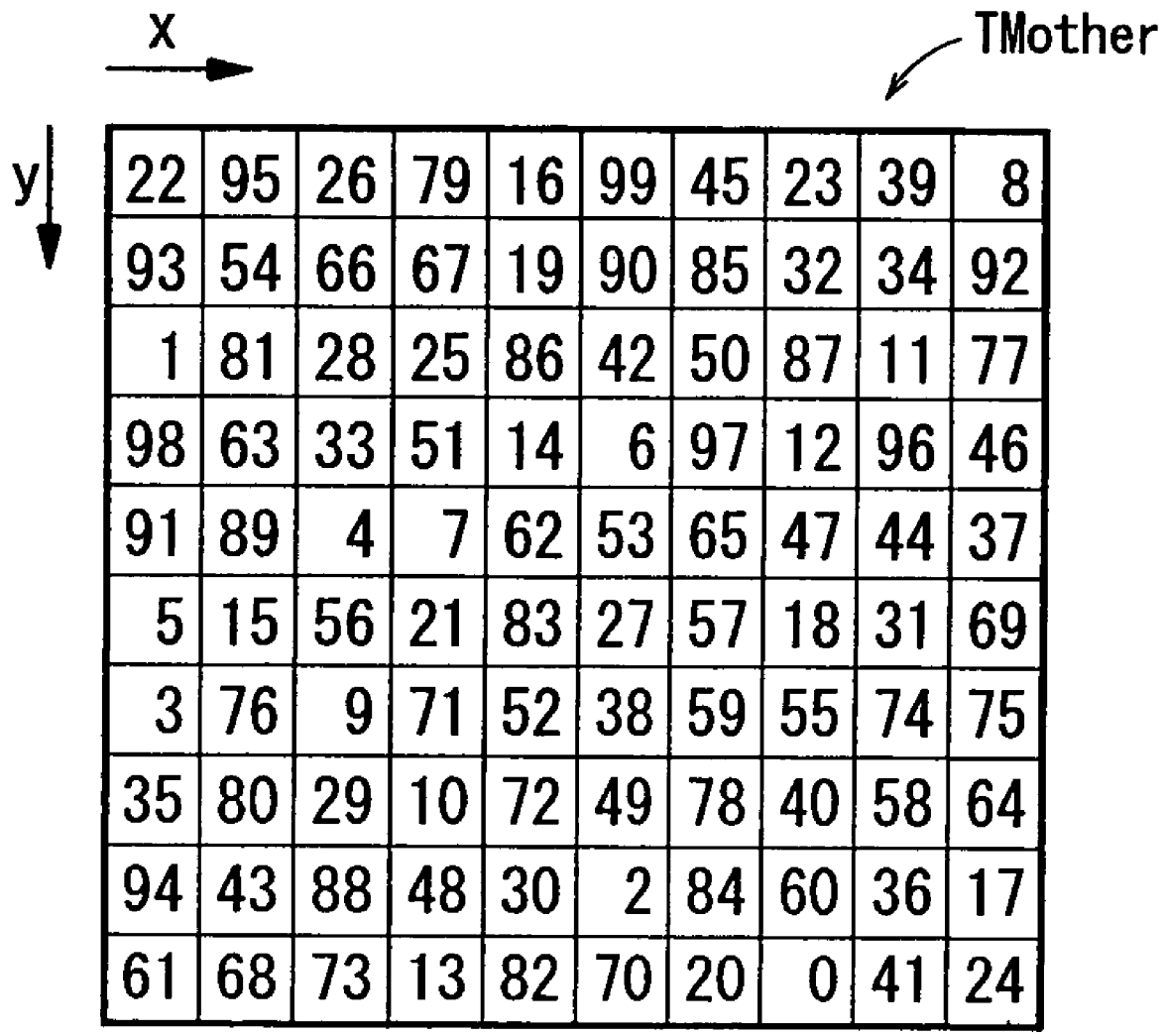
FIG. 17 is a diagram showing the generated threshold matrix.

Specifically, one example therein is reprinted in FIG. 15. A threshold matrix TMorg for a certain color plate used for a FM screen is generated, and the matrix size thereof is 10×10. Then, as shown in FIG. 16, four threshold matrixes TMorg are arranged. When a first reading address, i.e., a position for starting reading thresholds, Rs (x, y) in view of x-axis (row) and y-axis (column) is changed from Rs (1, 1) to Rs (5, 4), a new threshold matrix TMother having another threshold array as shown in FIG. 17 is obtained easily.

For changing reading method, as well as changing the first reading address as above, other reading methods may be utilized, such as changing the reading direction of the threshold array for rearrangement (e.g., reading the threshold array from the right to the left) or rotating the threshold array for rearrangement by, e.g., 90 degrees.

Further, in the first and second assigning methods, the sizes of threshold matrixes for C-plates, M-plates, Y-plates and K-plates are changed, so that unnecessary periodic pattern in the dot pattern can be reduced.

Figure 18:
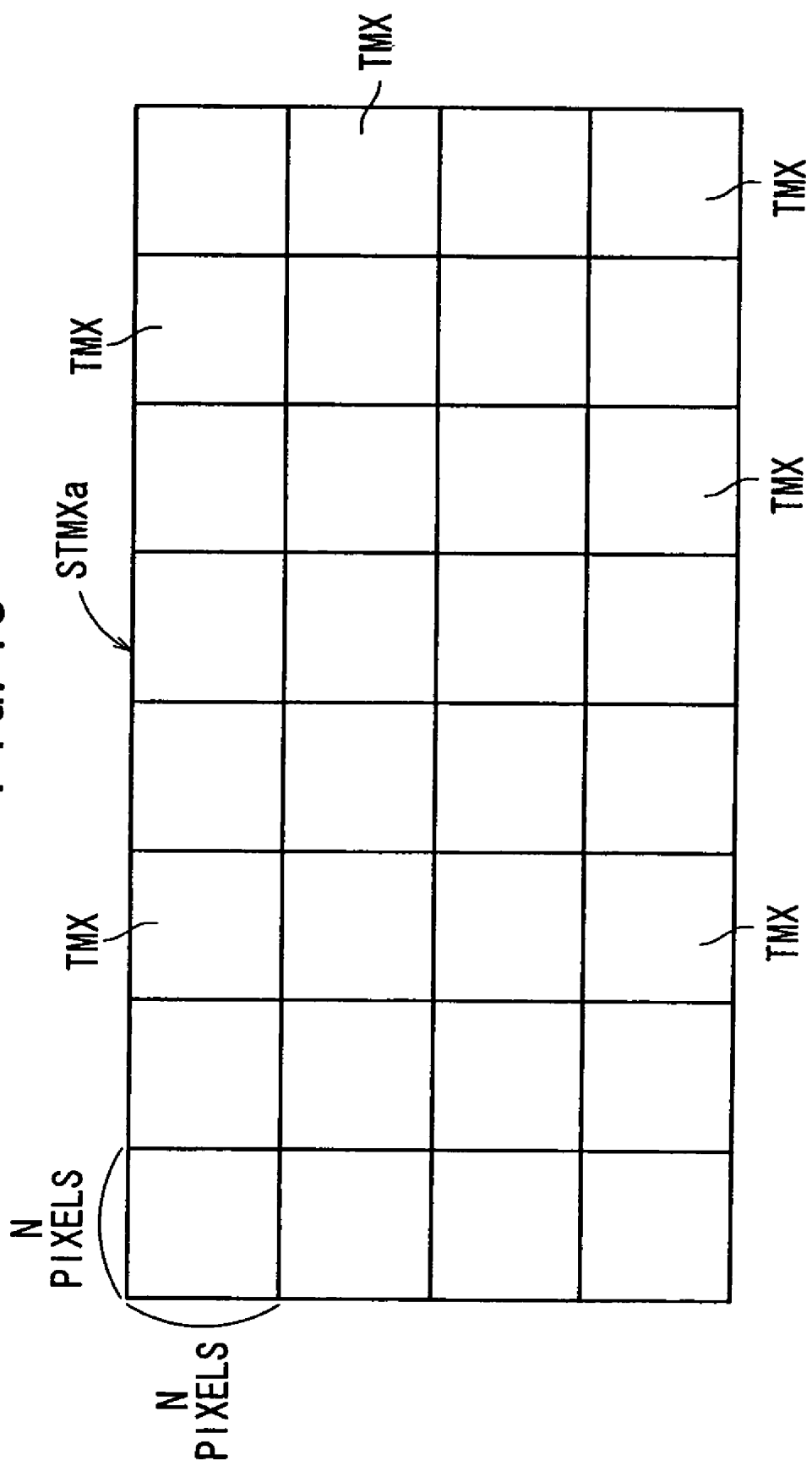
FIG. 18 is a diagram showing a superthreshold matrix in which threshold matrixes each having the same matrix size are arranged.

As shown in FIG. 18, the threshold matrixes TMX are arranged for use as a superthreshold matrix STMXa corresponding to N×N pixels that are output from the output system 22 and that are formed on the printing plate PP or the like. Even when the threshold matrixes each having a different threshold array are used, some repetitive patterns at a matrix size of the threshold matrix TMX for each plate are emphasized by superimposing four plates for C, M, Y and K, if the sizes of the threshold arrays are the same.

Figure 19:
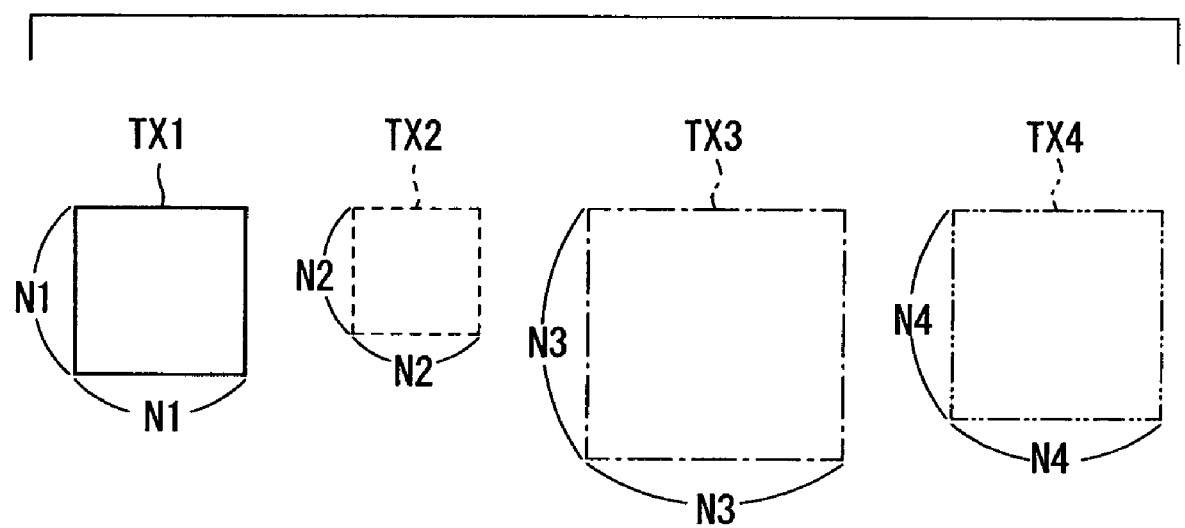
FIG. 19 is a diagram showing threshold matrixes each having a different matrix size.

Thus, as shown in FIG. 19, threshold matrixes TX1 through TX4 each having a different matrix size for the plates for C, M, Y and K are prepared. The relationships between the threshold matrixes TX1 through TX4 and the plates for C, M, Y and K may be determined desirably. The threshold matrixes TX1 through TX4 have matrix sizes: N1×N1 (shown in a solid line), N2×N2 (shown in a dashed line), N3×N3 (shown in a dot-and-dash line) and N4×N4 (shown in a two-dot-and-dash line), respectively (N2<N1<N4<N3). For example, the matrix size of N1×N1 means that the array has the N1×N1 thresholds corresponding to the N1×N1 pixels.

Figure 20:
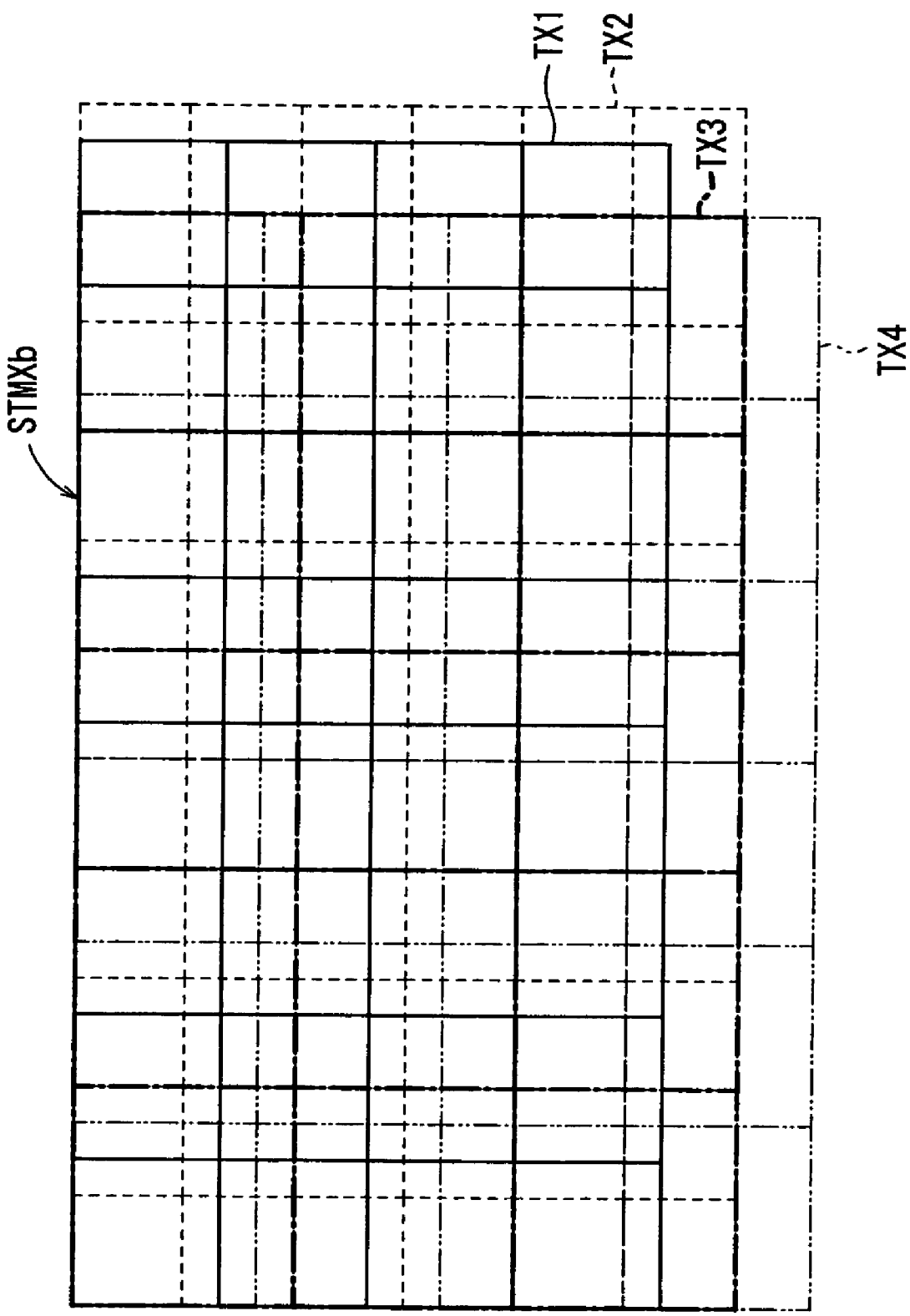
FIG. 20 is a diagram showing a superthreshold matrix in which the threshold matrixes each having a different matrix size are arranged.

Then, as show in FIG. 20, the threshold matrixes TMX1 through TX4 are arranged for use as a superthreshold matrix STMXb for the plates for C, M, Y and K. In this case, even if each of the threshold matrixes TMX1 through TX4 has a repetitive pattern in itself, any periodic pattern is not emphasized in superimposing the four plates for C, M, Y and K since matrix sizes of N×N for the four plates are different from each other. It is preferable that the matrix sizes of N×N for the plates for C, M, Y and K are all different from each other; however, some of the matrix sizes of N×N may be the same.

If multiple numbers of 8, 16, 32, 64 or the like are chosen for the number N in the matrix size of N×N, computational speed can be accelerated easily. For example, the matrix sizes can be chosen as follows. (N1, N2, N3, N4)=(128, 144, 160, 176), (128, 160, 192, 224), (256, 320, 384, 448), (512, 576, 640, 704), and so on.

Figure 21:
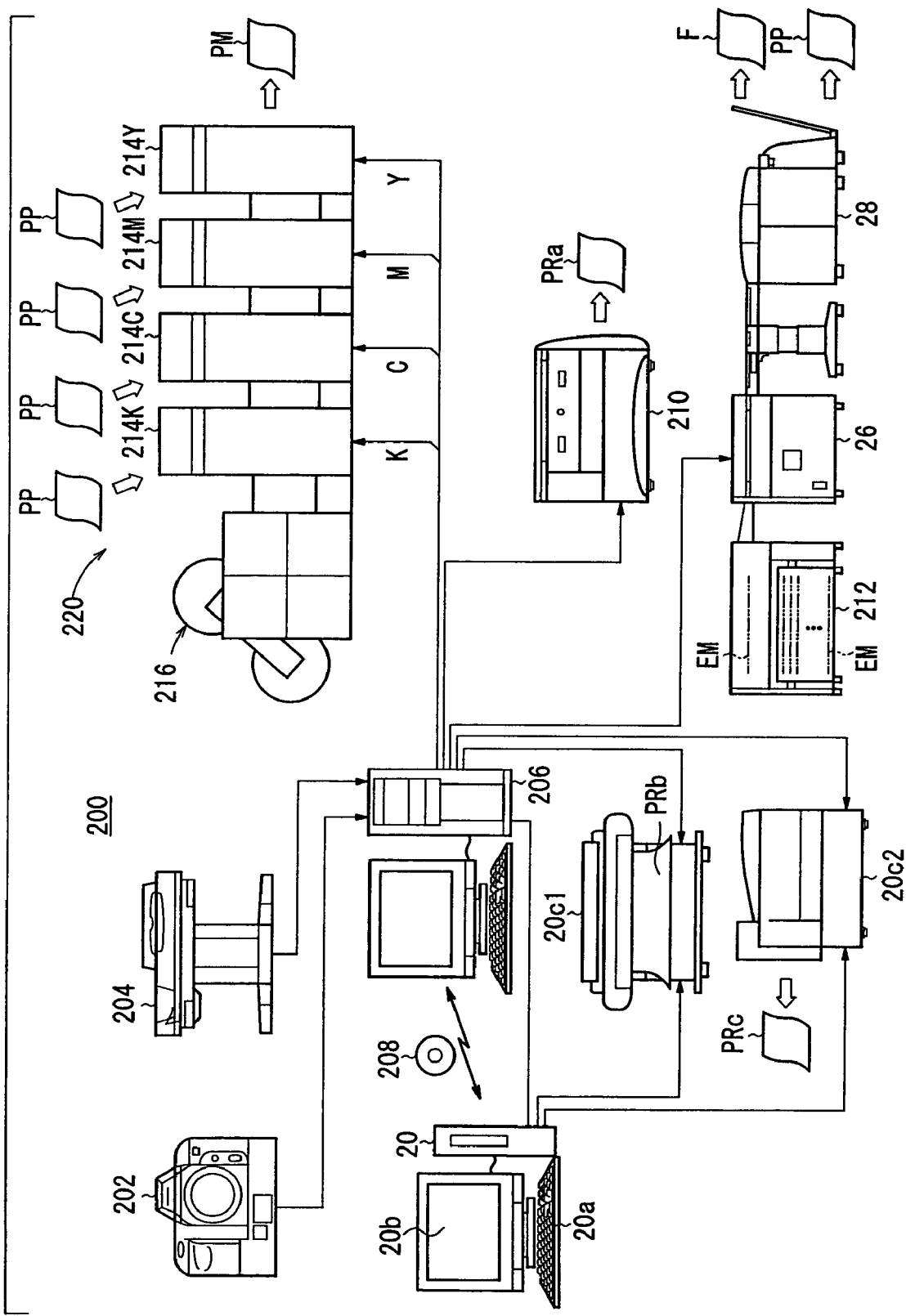
FIG. 21 is a block diagram of a printing/platemaking system incorporating threshold matrixes generated by a threshold matrix generating apparatus.
Figure 22:
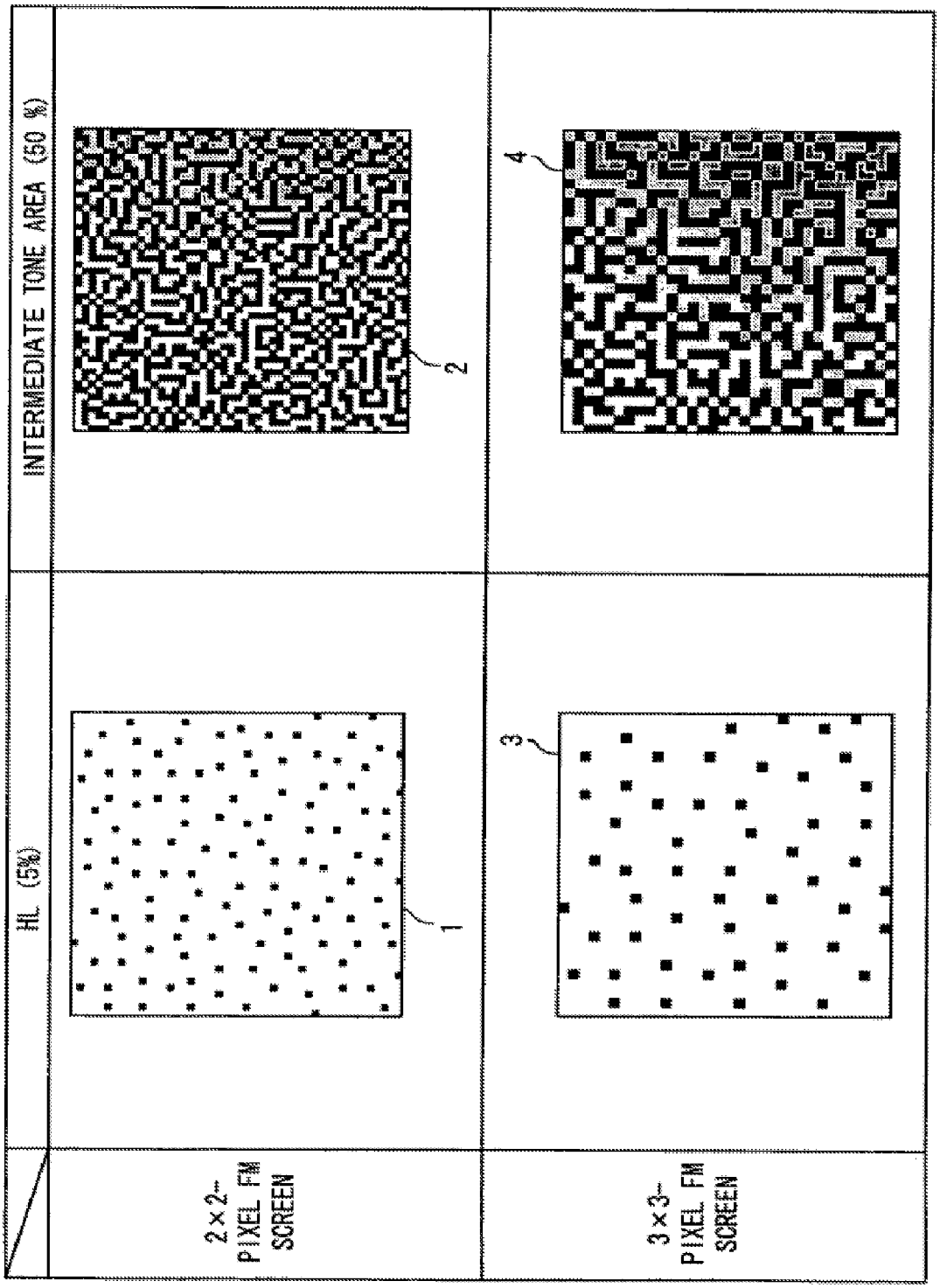
FIG. 22 is a diagram showing dot patterns at dot percentages of 5% and 50% of 2×2 pixel FM-screened dots and dot patterns at dot percentages of 5% and 50% of 3×3 pixel FM-screened dots according to conventional art.
Figure 23:
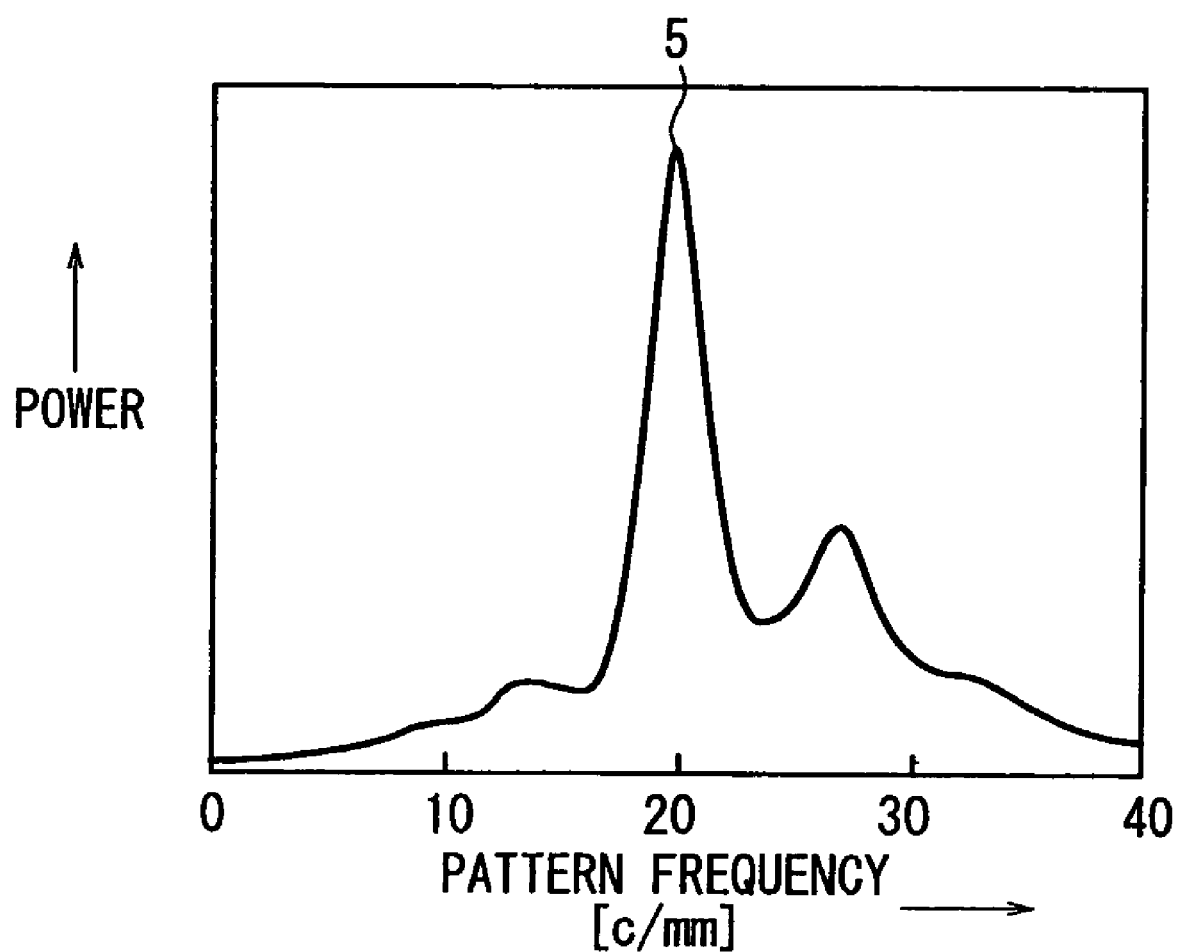
FIG. 23 is a diagram showing a power spectrum generated when the dot pattern at the dot percentage of 50% of the 2×2 pixel FM-screened dots is processed by FFT.

Threshold matrixes thus generated may be used as follows:

FIG. 21 shows a printing/platemaking system 200 incorporating threshold matrixes generated by the threshold matrix generating apparatus 20 of the threshold matrix generating system 10 shown in FIG. 1.

In the printing/platemaking system 200, RGB image data captured by a digital camera 202 as an image capturing unit or RGB image data (or CMYK image data) read by a plate input machine 204 as a scanner (image reader) are supplied to an RIP (Raster Image Processor) 206, which converts the RGB image data into CMYK image data.

The RIP 206 stores in its storage unit such as a hard disk or the like data of threshold matrixes TM (threshold matrix data) generated by the threshold matrix generating apparatus 20 and supplied through an optical disk 208 serving as a storage unit such as a CD-R or the like or through a communication link.

The RIP 206 compares the continuous-tone image data in C, M, Y and K each having the tone value u (for example, u=256) and the corresponding threshold matrix data for C, M, Y and K with each other, and converts the CMYK image data into CMYK dot pattern data (v-valued image data for each C, M, Y and K) representative of a v-valued ($2 \leq v < u$) image in which no screen ruling or screen angle is defined.

The CMYK dot pattern data are then sent to a DDCP (Direct Digital Color Proofer) 210, which produces a print proof PRa on a sheet of paper. The DDCP 210 allows the operator to confirm noise components and printing quality on the print proof PRa before the image data are processed by a printing press 220. The sheet of paper used by the DDCP 210 may be a sheet of printing paper used by the printing press 220.

The RIP 206 delivers the CMYK dot pattern data to a color ink jet printer 20c1 which produces a printing proof PRb on a sheet of paper or a color electrophotographic printer 20c2 which produces a printing proof PRc on a sheet of paper.

The CMYK dot pattern data are also sent to the exposure unit 26 which serves as a filmsetter or a platesetter in the output system 22 such as a CTC apparatus or the like. If the exposure unit 26 is a filmsetter, the automatic developing machine 28 generates a film F. The film F is superposed on a printing plate material, and exposed to light by a planar exposure unit (not shown), producing a printing plate PP. If the exposure unit 26 is a platesetter as shown in FIG. 1, then the automatic developing machine 28 directly outputs a printing plate PP. The exposure unit 26 is supplied with printing plate materials EM from a magazine 212 of photosensitive materials (including plate materials).

CMYK printing plates PP are mounted on plate cylinders (not shown) in a K-plate printer 214K, a C-plate printer 214C, an M-plate printer 214M, and a Y-plate printer 214Y of the printing press 220. In the K-plate printer 214K, the C-plate printer 214C, the M-plate printer 214M, and the Y-plate printer 214Y, the CMYK printing plates PP are pressed against a sheet of printing paper supplied from a printing paper supply unit 216 to transfer the inks to the sheet of printing paper, thereby producing a printed material PM on which a color image is reproduced. If the printing press 220 is configured as a CTC apparatus, then the RIP 206 supplies the CMYK dot pattern data directly through a communication link, and the printing plates mounted on the plate cylinders are exposed to record image data and then developed directly into printing plates PP.

Although certain preferred embodiments of the present invention have been shown and described in detail, it should be understood that various changes and modifications may be made therein without departing from the scope of the appended claims.

What is claimed is:

1. A method of generating a threshold matrix for converting a continuous-tone image into a dot pattern representing a binary image, the method comprising:
   determining a size of the threshold matrix;
   determining the number of pixels of a dot of a minimum size;
   determining a pattern frequency at a dot percentage of an intermediate tone;
   determining candidate positions for the dots of the minimum size in a dot pattern so that the pattern frequency is provided at the dot percentage;
   determining the number of new dots of the minimum size at a next dot percentage with respect to a present dot percentage for which a dot pattern has been determined; and
   determining placement positions of thresholds in the threshold matrix so that the dot pattern corresponding to the next dot percentage is obtained by conversion with the threshold matrix, the dot pattern made up of dots in which the number of pixels is adjusted,
   wherein the determining the placement positions of the thresholds comprises:
   determining candidate positions for placing the thresholds based on the candidate positions for the dots of the minimum size in a dot pattern at the next dot percentage and the number of new dots of the minimum size at the next dot percentage; and
   determining the placement positions of the thresholds by adjusting the number of pixels of each of the dots so that the dot pattern has the next dot percentage.

2. A method according to claim 1, wherein the determining the candidate positions for the dots in the dot pattern comprises:
   determining the dot pattern of the intermediate tone so that the dot pattern has the pattern frequency; and
   using the determined dot pattern of the intermediate tone as the candidate positions for the dots of the minimum size in the dot pattern at the next dot percentage.

3. A method according to claim 1, wherein the intermediate tone has dot percentages in a range from 10% to 90%.

4. A method according to claim 1, wherein the determining the number of the new dots of the minimum size at the next dot percentage comprises:
   determining the number of the new dots such that the number of the dots in the dot pattern is gradually reduced from the number of the dots corresponding to an ideal FM screen in a dot percentage range from 0% to a certain percentage; and
   determining the number of the new dots such that the number of the new dots is zero in a dot percentage range from the certain percentage to 50%.

5. A method according to claim 1, wherein the determining the number of the new dots of the minimum size at the next dot percentage comprises:
   determining the number of the new dots such that the number of the dots in the dot pattern is gradually reduced from the number of the dots corresponding to an ideal FM screen in a dot percentage range from 0% to a first percentage;
   determining the number of the new dots such that the number of the new dots is zero in a dot percentage range from the first percentage to a second percentage; and determining the number of the new dots such that the number of the dots in the dot pattern is gradually increased in a dot percentage range from the second percentage to 50%.

6. The method according to claim 1, wherein the number of pixels comprising a dot of a minimum size is a number of contiguous pixels determined by a minimum dot size that can be stably output from an output system.

7. A threshold matrix for converting a continuous-tone image into a dot pattern representing a binary image, the threshold matrix having a matrix size of N×M (N =M included), wherein an output system has an output resolution R pixels/mm and a dot pattern generated from continuous-tone image data whose pixel values correspond to a dot percentage of 50% as binary data has a pattern frequency r c/mm, the dot pattern is generated such that dots of a predetermined minimum size which are made up of n pixels (n is at least 1) are placed out of contact with each other at dot percentages from 0% to a specified percentage where the number of dots becomes about N×M/(R/r)2, and the dot pattern is generated such that pixels are attached to a periphery of existing dots of the minimum size and that the number of dots is not increased at dot percentages more than the specified dot percentage where the number of the dots becomes about N×M/(R/r)2.

8. A storage unit for storing the threshold matrix according to claim 7 as data.

9. A raster image processor having the storage unit for storing the threshold matrix according to claim 7 as data.

* * * * *